US006703082B1

(12) United States Patent
Wand et al.

(10) Patent No.: US 6,703,082 B1
(45) Date of Patent: Mar. 9, 2004

(54) BOOKSHELF LIQUID CRYSTAL MATERIALS AND DEVICES

(75) Inventors: Michael Wand, Boulder, CO (US); Kundalika M. More, Denver, CO (US); Xin-Hua Chen, Erie, CO (US); William Thurmes, Longmont, CO (US)

(73) Assignee: Displaytech, Inc., Longmont, CO (US)

( * ) Notice: Subject to any disclaimer, the term of this patent is extended or adjusted under 35 U.S.C. 154(b) by 36 days.

(21) Appl. No.: 09/885,862

(22) Filed: Jun. 20, 2001

(51) Int. Cl.$^7$ .................... C09K 19/32; C09K 19/30; C09K 19/12
(52) U.S. Cl. ............. 428/1.1; 252/299.62; 252/299.63; 252/299.67
(58) Field of Search ................. 252/299.62, 299.67, 252/299.63; 428/1.1

(56) References Cited

U.S. PATENT DOCUMENTS

| 4,367,924 A | 1/1983 | Clark et al. ................. 350/334 |
| 4,886,619 A | 12/1989 | Janulis ..................... 252/299.1 |
| 5,062,691 A | 11/1991 | Tristani-Kendra et al. .... 359/56 |

(List continued on next page.)

FOREIGN PATENT DOCUMENTS

| EP | 405868 A2 | 2/1991 | ........... C09K/19/42 |
| EP | 255236 | 5/1994 | ........... C09K/19/20 |
| EP | 425304 B1 | 7/1996 | ........... G02F/1/137 |
| EP | 579545 B1 | 12/1997 | ......... G02F/1/1337 |
| EP | 736078 B1 | 6/1998 | ........... C09K/19/04 |
| JP | A-1-213390 | 8/1989 | ........... C09K/19/46 |
| JP | A-1-316339 | 12/1989 | ......... C07C/43/20 |
| JP | A-1-316367 | 12/1989 | ........ C07D/239/26 |
| JP | A-1-316372 | 12/1989 | ........ C07D/319/06 |
| JP | 8082778 A | 3/1996 | ............ G02F/1/13 |
| JP | A-1-228128 | 8/2000 | ......... H01H/13/04 |
| WO | WO 91/00897 | 1/1991 | .......... C09K/19/34 |
| WO | WO 97/36908 | 10/1997 | ............. C07F/7/21 |
| WO | WO 99/33814 | 7/1999 | ........ C07D/239/26 |
| WO | WO 00/31210 | 6/2000 | ........... C09K/19/04 |

OTHER PUBLICATIONS

US 6,030,547, 2/2000, Hasegawa et al. (withdrawn)
Drzewinski, W. et al. "Antiferroelectric Liquid Crystals with Fluorinated Parts of Terminal Chains" CAPLUS 1998:624787.
Arnett, K.E. et al., "Technique For Measuring Electronic–Based Electro–Optic Coefficients of Ferroelectric Liquid Crystals" (1995), *Mat. Res. Soc. Symp. Proc.* 392:135–146.
Blinov L.M. and Tournilhac, F., "Infra–Red Dichroism of Mesophases Formed by Polyphilic Molecules. I. Development of the Technique and Study of Compounds With One Long Perfluorinated Tail"(1993), *Molecular Materials* 3(1):93–111.
Booth, C.J. et al., "The ferro–,ferri–and antifero–electric properties of a series of novel 2–or 3–substituted–alkyl 4–(4'–dodecyloxybiphenyl–4–carbonyloxy)–benzoate esters" (1996), *Liquid Crystals* 20(6):815–823.
Booth, C.J. et al., "Achiral swallow–tailed materials with 'antiferroelectric–like' structure and their potential use in antiferroelectric mixtures" (1996), *Liquid Crystals* 20(4):387–392.
Chandani, A.D. et al., "Novel Phases Exhibiting Tristable Switching" (Jul. 1989), *Jpn. J. App. Phys.* 28:L1261–1264.

(List continued on next page.)

*Primary Examiner*—Shean C. Wu
(74) *Attorney, Agent, or Firm*—Greenlee, Winner and Sullivan, P.C.

(57) ABSTRACT

Liquid crystal materials that exhibit bookshelf structures are provided. When these bookshelf materials are incorporated into a bistable host material, the mixture exhibits a higher switching angle and increased A to C phase transition than bistable hosts without the bookshelf material. These bookshelf materials and bistable compositions are useful in liquid crystal displays, for example.

17 Claims, 1 Drawing Sheet

U.S. PATENT DOCUMENTS

| | | | | |
|---|---|---|---|---|
| 5,082,587 A | 1/1992 | Janulis | ................... | 252/299.01 |
| 5,110,497 A | 5/1992 | Suzuki et al. | ............... | 252/299 |
| 5,169,556 A | 12/1992 | Mochizuki | ............. | 252/299.62 |
| 5,254,747 A | 10/1993 | Janulis | ....................... | 568/650 |
| 5,262,082 A | 11/1993 | Janulis et al. | .......... | 252/299.01 |
| 5,275,757 A | 1/1994 | Mineta et al. | ......... | 252/299.61 |
| 5,322,639 A | 6/1994 | Kawabata et al. | ..... | 252/299.62 |
| 5,327,273 A | 7/1994 | Beresmev et al. | .......... | 359/104 |
| 5,340,498 A | 8/1994 | Arai et al. | ............. | 252/299.65 |
| 5,346,646 A | 9/1994 | Kawabata et al. | ..... | 252/299.62 |
| 5,348,685 A | 9/1994 | Mochizuki et al. | .... | 252/299.62 |
| 5,352,379 A | 10/1994 | Nishiyama et al. | .... | 252/299.62 |
| 5,356,561 A * | 10/1994 | Shimizu et al. | ........ | 252/299.62 |
| 5,367,391 A | 11/1994 | Johno et al. | ................... | 359/91 |
| 5,374,375 A | 12/1994 | Yui et al. | ............... | 252/299.65 |
| 5,377,033 A | 12/1994 | Radcliffe | ....................... | 359/75 |
| 5,378,396 A | 1/1995 | Yui et al. | ............... | 252/299.65 |
| 5,389,287 A | 2/1995 | Nishiyama et al. | .... | 252/299.01 |
| 5,399,291 A | 3/1995 | Janulis et al. | .......... | 252/299.01 |
| 5,399,701 A | 3/1995 | Janulis | ....................... | 546/298 |
| 5,417,883 A | 5/1995 | Epstein et al. | ......... | 252/299.01 |
| 5,437,812 A | 8/1995 | Janulis et al. | .......... | 252/299.01 |
| 5,455,697 A | 10/1995 | Coles et al. | ............... | 359/103 |
| 5,474,705 A | 12/1995 | Janulis et al. | .......... | 252/299.01 |
| 5,482,650 A | 1/1996 | Janulis et al. | .......... | 252/299.01 |
| 5,498,368 A | 3/1996 | Coles | ..................... | 252/294.67 |
| 5,529,718 A | 6/1996 | Hornung et al. | ....... | 252/299.61 |
| 5,534,190 A | 7/1996 | Johno et al. | ........... | 252/299.65 |
| 5,543,078 A | 8/1996 | Walba et al. | ............ | 252/299.65 |
| 5,547,604 A | 8/1996 | Coles et al. | ........... | 252/299.01 |
| 5,568,299 A | 10/1996 | Yoshihara et al. | .......... | 359/100 |
| 5,583,682 A | 12/1996 | Kitayama et al. | ........... | 349/172 |
| 5,595,682 A | 1/1997 | Goodby et al. | ........ | 252/299.01 |
| 5,658,491 A | 8/1997 | Kistner et al. | ......... | 252/299.01 |
| 5,660,762 A | 8/1997 | Ito et al. | ................. | 252/299.67 |
| 5,695,683 A | 12/1997 | Takeichi et al. | ........ | 252/299.61 |
| 5,702,637 A | 12/1997 | Johnson et al. | ........ | 252/299.61 |
| 5,719,653 A | 2/1998 | Minato et al. | .............. | 349/156 |
| 5,723,069 A | 3/1998 | Mineta et al. | ......... | 252/299.67 |
| 5,728,864 A | 3/1998 | Motoyama et al. | ............ | 560/59 |
| 5,748,164 A | 5/1998 | Handschy et al. | ............ | 345/89 |
| 5,750,214 A | 5/1998 | Ito et al. | ........................ | 428/1 |
| 5,770,108 A | 6/1998 | Totani et al. | .......... | 252/299.61 |
| 5,808,800 A | 9/1998 | Handschy et al. | .......... | 359/630 |
| 5,827,448 A | 10/1998 | Konuma et al. | ....... | 252/299.61 |
| 5,855,812 A | 1/1999 | Radcliffe et al. | ...... | 252/299.01 |
| 5,855,813 A | 1/1999 | Coles et al. | ............. | 252/299.5 |
| 5,856,815 A | 1/1999 | Mochizuki et al. | ........... | 345/97 |
| 5,858,273 A | 1/1999 | Asaoka et al. | ............ | 252/299.4 |
| 5,861,108 A | 1/1999 | Ishida et al. | ............ | 252/299.62 |
| 5,861,109 A | 1/1999 | Goodby et al. | ........ | 252/299.65 |
| 5,888,420 A | 3/1999 | Sakai et al. | ............. | 252/299.01 |
| 5,922,242 A | 7/1999 | Saishu et al. | .......... | 252/299.62 |
| 5,928,562 A | 7/1999 | Kistner et al. | ........... | 252/299.6 |
| 5,936,689 A | 8/1999 | Saishu et al. | ................ | 349/123 |
| 5,938,973 A | 8/1999 | Motoyama et al. | .... | 252/299.65 |
| 5,942,155 A | 8/1999 | Coles et al. | ........... | 252/299.64 |
| 5,943,112 A | 8/1999 | Mochizuki et al. | ......... | 349/173 |
| 5,949,391 A | 9/1999 | Saishu et al. | ................ | 345/50 |
| 5,951,914 A | 9/1999 | Matsumoto et al. | ... | 252/299.67 |
| 5,968,413 A | 10/1999 | Mine et al. | ............ | 252/299.65 |
| 5,972,241 A | 10/1999 | Johnson et al. | ........ | 252/299.61 |
| 5,972,243 A | 10/1999 | Mine et al. | ............ | 252/299.65 |
| 5,976,409 A | 11/1999 | Mineta et al. | ......... | 252/299.65 |
| 5,980,780 A | 11/1999 | Motoyama et al. | .... | 252/299.64 |
| 5,985,172 A | 11/1999 | Motoyama et al. | .... | 252/299.64 |
| 6,001,278 A | 12/1999 | Matsumoto et al. | ... | 252/299.65 |
| 6,002,042 A | 12/1999 | Mine et al. | ................... | 560/66 |
| 6,007,737 A | 12/1999 | Nishiyama et al. | .... | 252/299.01 |
| 6,018,070 A | 1/2000 | Ito et al. | ........................ | 560/76 |
| 6,019,911 A | 2/2000 | Hirano et al. | ................ | 252/299 |
| 6,045,720 A | 4/2000 | Shundo et al. | ......... | 252/299.61 |
| 6,051,639 A | 4/2000 | Mehl et al. | ................... | 524/205 |
| 6,057,007 A | 5/2000 | Amano et al. | ................. | 428/1 |
| 6,084,649 A | 7/2000 | Amano et al. | ................ | 349/96 |

OTHER PUBLICATIONS

Chandani, A.D. et al., "Antiferroelectric Chiral Smectic Phases Responsible for the Tristable Switching in MHPOBC" (Jul. 1989), *Jpn. J. App. Phys.* 28:L1265–1268.

Chandani, A.D. et al., "Tristable Switching in Surface Stabilized Ferroelectric Liquid Crystals with a Large Spontaneous Polarization" (May 1988), *Jpn. J. App. Phys.* 27(5):L729–L732.

Clark, N.A. and Lagerwall, S.T., "Submicrosecond bistable electro–optic switching in liquid crystals" (Jun. 1980), *Appl. Phys. Lett.* 36:899.

Dawson, D.J. et al., "Cocyclotrimerization of Aryl Acetylenes: Substituent Effects on Reaction Rate" *Am. Chem. Soc. Sym.* 346 Ch 38:446–456.

de Vries, A., "Experimental Evidence Concerning Two Different Kinds Of Smectic C To Smectic A Transitions" (1977), *Mol. Cryst. Liq. Cryst.* (Letters) 41:27–31.

de Vries, A., "The Implications of the Diffuse–Cone Model for Smectic A and C Phases and A–C Phase Transitions" (1979), *Mol. Cryst. Liq. Cryst* (Letter). 49:179–185.

Edgar, K. J. and Falling, S.N., "An Efficient and Selective Method for the Preparation of Iodophenols" (1990) *Org. Chem.* 55: 5287–5291.

Fleming, F. F. and Jiang, T., "Unsaturated Nitriles: Optimized Coupling of the Chloroprene Grignard Reagent[1] with ω–Bromonitriles" *J. Org. Chem.* (1997) 62:7890–7891.

Gorecka, E. et al., "Molecular Orientational Structures in Ferroelectric, Ferrielectric and Antiferroelectric Smectic Liquid Crystal Phases as Studied by Conoscope Observation" (Jan. 1990), *Jap. J. Appl. Phys.* 29(1):L131–L137.

Hartmann, W., "Uniform SSFLC Director Pattern Switching" (1998), *Ferroelectrics* 85:67–77.

Heinemann, S. et al., "Synthesis and Dielectric Investigations of New Swallow–Tailed Monomers and Polymers" (1993), *Mol. Cryst. Liq. Cryst.* 237:277–283.

Heinemann, S. et al., "Competition between dipolar and steric interactions in swallow–tailed compounds" (1993), *Liquid Crystals* 13(3):373–380.

Hide, F. et al., "Dynamic Polarized Infrared Spectroscopy of Electric Field–Induced Molecular reorientation in a Chiral Smectic–A Liquid Crystal" (Sep. 1995), *Phys. Rev. Lett.* 75:2344–2347.

Inui, S. et al., "Thresholdless antiferroelectricity in liquid crystals and its application to displays"(1996), *J. Mater. Chem.* 6(4):671–673.

Johno, M. et al., "Correspondence between Smectic Layer Switching and DC Hysteresis of Apparent Tilt Angle in an Antiferroelectric Liquid Crystal Mixture" (Jan. 1990), *Jap. J. Applied Phys.* 29:L111–114.

Johno, M. et al., "Smectic Layer Switching by an Electric Field in Ferroelectric Liquid Crystals Cells" (Jan. 1989), *Jpn. J. App. Phys.* 28:L119–120.

Kagawa, A. et al., "Fast Response Time STN=LCD with High Contrast Ratio" (1995), *Proceedings of the 15th International Display Research Conference* 177–180.

Klopper et al., "IR–Modulation Spectroscopy on the Collective Dynamics of Free–Standing Ferroelectric Liquid Crystalline Films" (Jan. 1997), *J. Physique II* 7(1):57–67.

Matsumoto, T. et al., "A novel property caused by frustration between ferroelectricity and antiferroelectricity and its application to liquid crystal displays—frustoelectricity and V–shaped switching" (Sep. 1999) *J. Mater. Chem.* 9:2051–2080.

Mikami, K. et al., "Binaphthol–Titanium Complex–Catalyzed Fluoral–Ene Reaction with Vinyl Sulfides for Asymmetric Synthesis of Diastereomeric α Trifluoromethyl–β–methyl Carbinols: Diastereomer Switch of Antiferroelectric or Ferroelectric Properties of Diastereomeric Liquid–Crystalline Systems[1]" (Sep. 1996) *SYNLETT* 837–838.

Mochizuki, A. et al., "A High Contrast and High Transmittance Multiplexing SSFLC Display Utilizing Naphthalene Base Liquid Crystal Materials" (1991), *Ferroelectrics* 122:37–51.

Mottram, N.J. and Elston, S.J., "Preliminary communication Thresholdless switching induced by polar anchoring in antiferroelectric liquid crystals" (1999) *Liquid Crystals* 26(12):1853–1856.

Nakagawa, A., A Hysteresis Model for Antiferroelectric $SmC_{A*}$ (Aug. 1991), *Jap. J. App. Phys.* 30:L1759–1764.

Ostrovskii, B.I. et al., "Evidence of Tilted Dimeric Mesophase for Terminally Polar Polyphilic Mesogens" (1995), *J. Physique II* 5(7):979–1001.

Park, B. et al., "Molecular motion in a smectic liquid crystal showing V–shaped switching as studied by optical second–harmonic generation" (Apr. 1999) *Physical Review E* 59(4) 3815–3818.

Perova, T.S. et al., "Study Of The Molecular Orientation In A Chiral Smectic Liquid Crystal Mixture using Infrared Dichroism" (1996), *Ferroelectrics* 180(1–4):105–115.

Redmond, M. et al., "Ferroelectric and Electroclinic Characterisation of a New Organic Siloxane Bimesogen." (1992)*Ferroelectrics* 148:323–336.

Rieker, T.P. et al., ""Chevron" Local Layer Structure in Surface–Stabilized Ferroelectric Smectic–C Cells" (Dec. 1987), *Physical Rev. Letts.* 59(23):2658–2661.

Rudquist, J.P. et al., "The case of thresholdless antiferroelectricity: polarization–stabilized twisted SmC* liquid crystals give V–shaped electro–optic response" (1999), *J. Mater. Chem.* 9:1257–1261.

Sakaigawa, A. and Nohira, H., "Properties of Ferroelectric Liquid Crystal Mixtures Containing Fluorine Substituted Compounds"(1993) *Ferroelectrics* 148:71–78.

Schmitt, K. et al., "Strongly non–linear optical ferroelectric liquid crystals for frequency doubling" (1993) *Liquid Crystals* 14(6) 1735–1752.

Seomun, S.S. et al., "Evolution of Switching Characteristics from Tristable to V–Shaped in an Apparently Antiferroelectric Liquid Crystal" (Jun. 1997), *J. Appl. Phys.* 36:3586–3590.

Takanishi, Y. et al., "Spontaneous Formation of Quasi–Bookshelf Layer Structure in New Ferroelectric Liquid Crystals Derived from a Naphthalene Ring" (Jun. 1990), *Jap. J. Applied Phys.* 29(6):L984–L986.

Tuffon, R. P., "Non–Chiral Compounds Exhibiting Alternating Tilt Smectic Phases" (1995) *Mol. Cryst. Liq. Cryst.* 260:51–67.

Zhuang, Z., "Interfacial Interactions, Director Configurations and Layer Structures of Surface Stabilized Ferroelectric Liquid Crystals" (1991), Ph.D. Thesis University of Colorado, Boulder CO. 105 pages.

* cited by examiner

BOOKSHELF LIQUID CRYSTAL MATERIALS AND DEVICES

BACKGROUND OF THE INVENTION

This invention is in the field of electrooptical devices and liquid crystal materials used in such devices. More particularly, the invention relates to bookshelf-type liquid crystal materials and devices employing such liquid crystal materials.

Liquid crystals have found use in a variety of electrooptical and display device applications, in particular those which require compact, energy-efficient, voltage-controlled light valves such as watch and calculator displays.

Thermotropic liquid crystal molecules typically possess structures which combine a rigid core coupled with two relatively "floppy" tails. Such LC molecules are generally rod-like in shape with the rigid core generally along the long axis of the molecule. Ferroelectric liquid crystal (FLC) materials have been prepared by the introduction of one or more chiral nonracemic LC molecules having one or more stereocenters in at least one of the tails to introduce chirality. The first FLC compound to be characterized was DOBAMBC which contains an (S)-2-methylbutyloxy chiral tail. Pure DOBAMBC exhibits a smectic C* phase with a ferroelectric polarization of $-3$ nC/cm$^2$.

Electro-optic effects with sub-microsecond switching speeds can be achieved using the technology of N. A. Clark and S. T. Lagerwall(1980) Appl. Phys. Lett. 36:899 and U.S. Pat. No. 4,367,924. These investigators have reported display structures using FLC materials, the so-called Surface-Stabilized FLC (SSFLC) devices, having not only high speed, but which also exhibit bistable, threshold sensitive switching. Such properties make FLC-based devices excellent candidates for light modulation devices including matrix addressed light valves containing a large number of elements for passive displays of graphic and pictorial information, optical processing applications, as well as for high information content dichroic displays.

It is, however, well known in the art of FLC materials and devices that a typical FLC device does not exhibit true optical bistability, that is, the memory or the zero applied field orientation of the optic axis of the SSFLC device is typically different from that of its driven orientation. Descriptions of the construction and operation of a conventional bistable FLC device can be found, for example, in U.S. Pat. Nos. 5,748,164 and 5,808,800. The FLC materials used in these conventional devices exhibit smectic layer spacing shrinkage at the smectic A to smectic C transition and further into the smectic C phase. The most significant consequence of the decrease in smectic layer thickness is the formation of chevron smectic layer structures. In addition to inducing many defects, formation of such chevron structures, in effect, adds an extra interface at the chevron interface which is a nominally planar interface roughly parallel to the plane of the FLC film. This extra interface is internal to FLC materials, and together with the two surfaces bounding the FLC materials and the external electric field, determines the orientation of the optic axis of the FLC device. The added constraint imposed by the chevron interface is that the orientation of the optic axis of the FLC devices under an applied electric field depends on the strength of the applied field, and is, thus, different from the memory orientation of the device in the absence of the applied field. See, for example, Rieker, T. et al. (1987) Physical Rev. Letts. 59(23):2658 for a discussion of chevron layer structure in SSFLC cells.

FIG. 1A schematically illustrates a typical electrooptical response (output light intensity as a function of applied voltage) of a conventional bistable FLC device. This conventional bistable device does not exhibit a true bistable switching and does not exhibit analog behavior. FLC compositions exhibiting bookshelf geometry will, in contrast, be substantially chevron-free when aligned in SSFLC devices and exhibit true bistable electrooptical response as schematically illustrated in FIG. 1B.

Much attention has focused on the construction of FLC electrooptical devices with true optically bistability which are extremely desirable in practical applications to achieve stable memory performance, high contrast ratio, wide viewing angle and high speed response. However, only a few FLC materials have been identified which exhibit true bistability. A small class of naphthalene-based LCs were reported to be useful for preparation of FLC mixtures exhibiting optical bistability (Mochizuki et al. (1991) Ferroelectrics 122:37–51, U.S. Pat. No. 5,169,556, EP published application 405,868 (published Feb. 1, 1991) and U.S. Pat. No. 5,348,685). These FLC materials are said to have bookshelf geometry and to exhibit no smectic layer spacing shrinkage at the smectic A (SmA) to the chiral smectic C (SmC*) transition and into the SmC* phase range, unlike many conventional FLC materials. U.S. Pat. Nos. 5,568,299, 5,856,815 and 5,943,112 report applications of the naphthalene-based FLCs of U.S. Pat. Nos. 5,169,556 and 5,348,685. Additional naphthalene-core LCs are reported to provide improvement in response times and/or temperature dependency of response time in U.S. Pat. No. 5,861,108.

U.S. Pat. Nos. 5,262,082, 5,437,812 and 5,482,650 report achiral LC compounds having perfluoroether terminal groups exhibiting smectic phases or latent smectic phases that are said to provide "reduced temperature dependence of the smectic interlayer spacing" and "spontaneous generation of a bookshelf layer structure ideal for a ferroelectric liquid crystal device." Preferred chiral LCs of these patents have a phenylpyrimidine core. A number of LC molecules have been reported to be useful in combination with these achiral bookshelf LCs.

U.S. Pat. Nos. 5,474,705, 5,702,637 and 5,972,241, as well as published EP application EP 736,078 (published Jun. 24, 1998) report chiral LC compounds also having a perfluoroether terminal portion or a chiral fluorinated terminal portion with preferred LC compounds having phenylpyrimidine cores. These patents report that the chiral LC molecules disclosed can be admixed with the achiral fluoroether-containing compounds of U.S. Pat. Nos. 5,262,082, 5,437,812 and 5,482,650 to exhibit "reduced temperature dependence of the smectic interlayer spacing" and "spontaneous generation of a bookshelf layer structure ideal for a ferroelectric liquid crystal device.

U.S. Pat. Nos. 5,658,491, 5,855,812 and 5,928,562 report a process for controlling cone tilt angle in tilted smectic FLC compositions. The compounds disclosed contain fluoroether or fluoroalkyl groups in the LC tail. The patents further report that the compounds useful in the invention can be admixed with the achiral fluoroether-containing compounds of U.S. Pat. Nos. 5,262,082, 5,437,812 and 5,482,650 to exhibit "reduced temperature dependence of the smectic interlayer spacing" and "spontaneous generation of a bookshelf layer structure."

U.S. Pat. Nos. 4,886,619, 5,082,587, 5,399,291, 5,399,701 report chiral and achiral LC molecules having tilted smectic mesophases or latent tilted smectic mesophases and having fluorocarbon terminal portions.

U.S. Pat. Nos. 5,750,214 and 5,858,273 report liquid crystal devices with certain alignment control, which is said to be useful in improving a switching characteristic of a chiral smectic liquid crystal composition having bookshelf structure. The patents refer to the use of FLC compositions in the method in which at least one component of the FLC composition has a fluorocarbon terminal portion. The patents refer specifically to the use of compounds of bookshelf LCs of U.S. Pat. No. 5,262,082.

U.S. Pat. Nos. 6,019,911 and 6,007,737 report various liquid crystal compositions having structures related to the naphthalene and phenyl pyrimidines that are noted above to exhibit spontaneous generation of bookshelf structure. However, none of the LC compounds disclosed in these patents is identified as exhibiting bookshelf structure or as useful in the preparation of chevron-free FLCs.

Various naphthalene-containing liquid crystals of general formula:

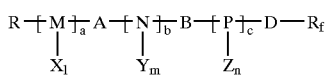

where M, N and P are various ring structures; A, B and D are linkers; R and Rf are tails and X, Y and Z are substitutents such as hydrogen, halogen, hydroxyl, methyl, methoxy, cyano or nitro; are reported in U.S. Pat. No. 5,972,241 (Johnson, Oct. 26, 1999) U.S. Pat. No. 5,702,637 (Dec. 30, 1997) U.S. Pat. No. 5,082,587 (Janulis, Jan. 21, 1992); U.S. Pat. No. 5,417,883 (Epstein, May 23, 1995); U.S. Pat. No. 5,399,291 (Janulis, Mar. 21, 1995); U.S. Pat. No. 5,858,273 (Asaoka, Jan. 12, 1999); U.S. Pat. No. 5,262,082 (Janulis, Nov. 16, 1993); U.S. Pat. No. 5,482,650 (Janulis, Jan. 9, 1996); U.S. Pat. No. 5,437,812 (Janulis, Aug. 1, 1995); U.S. Pat. No. 4,886,619 (Janulis, Dec. 12, 1989); U.S. Pat. No. 5,399,701 (Mar. 21, 1995); U.S. Pat. No. 5,254,747 (Janulis, Oct. 19, 1993); U.S. Pat. No. 5,474,705 (Janulis, Dec. 12, 1995); U.S. Pat. No. 5,254,747 (Janulis, Oct. 19, 1993); U.S. Pat. No. 5,082,587 (Janulis, Jan. 21, 1992); WO 00/31210 (Minnesota Mining and Manufacturing Company, published Jun. 2, 2000); European Patent 736078 (June, 1998); European Patent 255236 (Minnesota Mining and Manufacturing Company, May, 1994); WO 99/33814 (Minnesota Mining and Manufacturing Company, publication date Jul. 8, 1999); U.S. Pat. No. 5,928,562 (Kistner, Jul. 27, 1999); U.S. Pat. No. 5,855,812 (Radcliffe, Jan. 5, 1999); U.S. Pat. No. 5,658,491 (Kistner, Aug. 19, 1997); These patents and applications do not disclose bistable hosts.

U.S. Pat. Nos. 6,057,007, 6,084,649, report tristable liquid crystal devices comprising a tilted smectic or induced tilted smectic LC composition. Many of the LC molecules specifically exemplified have phenylpyrimidine cores and a chiral or achiral terminal fluorocarbon group.

There are two types of bookshelf materials known to date: naphthalene and partially-fluorinated poly-ether derivatives. Naphthalene derivatives have been reported to be easier to align than partially-fluorinated poly-ether derivatives but they typically have high viscosity and low switching angle (below 18°) which result in slow switching speed, low light throughput, and low A–C* transition. These disadvantages limit the color depth, contrast and brightness of the display and result in narrow operating and storage temperatures.

Bookshelf liquid crystal compositions that have lower viscosity, higher tilt angle, and higher A–C* transition than previously known compositions to minimize the drawbacks of chevron-type FLCs and allow DC balanced driving schemes that maximize light throughput are desired.

BRIEF SUMMARY OF THE INVENTION

The present invention provides electrooptical devices that contain bistable bookshelf liquid crystals. Provided are liquid crystal compositions comprising a bistable host material and one or more compounds of formula:

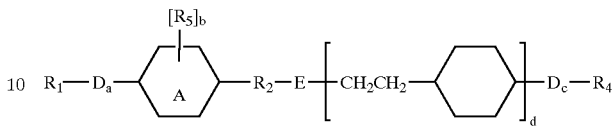

where R1 and R4 are selected from the group consisting of: straight chain alkyl chains and internally or terminally branched alkyl chains with from 3 to 12 carbons which are optionally partially fluorinated and may have one carbon replaced with —O—;

where A is a cyclohexyl ring, a cyclohexenyl ring or a phenyl ring;

D is either O or

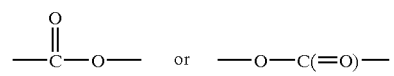

and the D's may be different;

a is 0 or 1;

b is 0, 1 or 2;

c is 0 or 1;

d is 0 or 1;

R5 is a fluorine atom;

R2 is a linker selected from the group consisting of: ethyl; butyl;

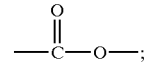

and —O—C(=O)—; and

E is a naphthalene ring or a 1,2,3,4-tetrahydronaphthalene ring

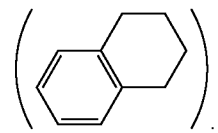

As used herein, "partially fluorinated" means that one or more hydrogens are replaced with a fluorine. "Partially fluorinated" also means that a hydrogen may be replaced with —CF$_3$. As used herein, "branched" includes internally or terminally branched.

The "compounds of the invention" are those compounds with the general formula above, as well other compounds described herein. The "compositions of the invention" are those compositions comprising one or more compounds of the invention in a bistable host.

Also provided are the compounds disclosed herein that are not previously known in the art.

One group of compounds of the invention are those of the general formula above, wherein one of R1 or R4 is (CH$_2$)$_n$(CF$_2$)$_m$F where n is an integer from 1 to 6 and m is an integer from 1 to 6. Another group of compositions of the invention are those wherein said bistable host material contains at least one naphthalene-containing compound. Another group of compositions of the invention are those with a switching angle greater than 15°. Another group of compositions of the invention are those with an A–C transition temperature greater than 50° C. Another group of compositions of the invention are those aligning in a device with a contrast ratio greater than 20:1. One group of compounds of the invention comprise those wherein the naphthalene-containing liquid crystal includes a partially fluorinated alkoxy tail. One group of compounds of the invention are those where A is a cyclohexyl ring. Another group of compounds of the invention are those where A is a cyclohexenyl ring. Another group of compounds of the invention are those where A is a phenyl ring.

One presently preferred group of compounds useful in the compositions of the invention are those containing a compound of formula (A):

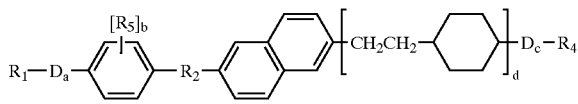

where R1 and R4 are selected from the group consisting of: straight chain alkyl chains and branched alkyl chains with from 3 to 12 carbons which are optionally partially fluorinated and may have one carbon replaced with —O—;

D is either O or

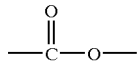

or —O—C(=O)— and the D's may be different;

a is 0 or 1;

b is 0, 1 or 2;

c is 0 or 1;

d is 0 or 1;

R5 is a fluorine atom;

R2 is a linker selected from the group consisting of: ethyl; butyl; —O—C(=O)—; and

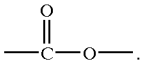

Presently preferred groups of compounds of the formula A are those wherein R1 is a partially fluorinated straight chain alkyl group and R4 is a nonfluorinated straight chain alkyl group and R2 is an ethyl group; those wherein R1 is an internally branched alkyl chain and R4 is a partially fluorinated alkyl chain and R2 is an ethyl group; those wherein R1 is a partially fluorinated straight chain alkyl chain and R4 is an alkyl chain where one of the carbons of the chain is replaced with O and another of the carbons of the chain is substituted with —CF3 or —CH3; and those wherein R1 is a partially fluorinated straight chain alkyl group and R4 is a nonfluorinated straight chain alkyl chain.

Another presently preferred composition of the invention comprises a bistable host material and a compound of formula (B):

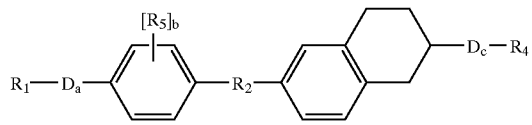

where R1 and R4 are selected from the group consisting of: straight chain alkyl chains and branched alkyl chains with from 3 to 12 carbons which are optionally partially fluorinated and may have one carbon replaced with —O—;

D is either O or

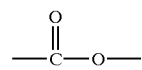

or —O—C(=O)— and the D's may be different;

a is 0 or 1;

b is 0, 1 or 2;

c is 0 or 1;

R5 is a fluorine atom;

R2 is a linker selected from the group consisting of: ethyl; butyl;

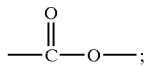

and —O—C(=O)—; and

Presently preferred compounds of formula B include those wherein R1 is a partially fluorinated straight chain alkyl group and R4 is an internally branched nonfluorinated alkyl chain.

Also provided are compounds of formula (C):

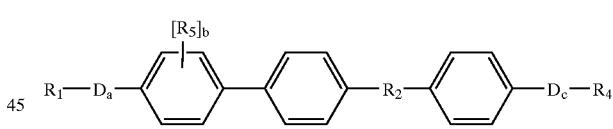

where R1 and R4 are selected from the group consisting of: straight chain and internally or terminally branched alkyl chains with from 3 to 12 carbons which are optionally partially fluorinated and may have one carbon replaced with —O—;

D is either O or

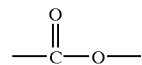

or —O—C(=O)— and the D's may be different;

a is 0 or 1;

b is 0, 1 or 2;

c is 0 or 1;

R5 is a fluorine atom;

R2 is a linker selected from the group consisting of: ethyl; butyl;

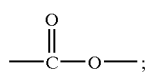

and —O—C(=O)—.

A presently preferred composition of the invention comprises a bistable host material and a compound of formula:

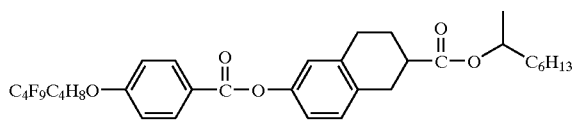

A presently preferred composition of the invention comprises a bistable host material and a compound of formula:

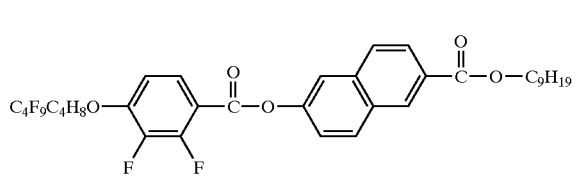

A presently preferred composition of the invention comprises a bistable host material and a compound of formula:

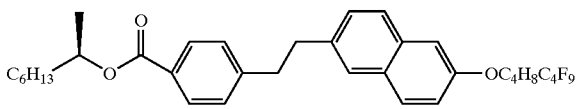

A presently preferred composition of the invention comprises a bistable host material and a compound of formula:

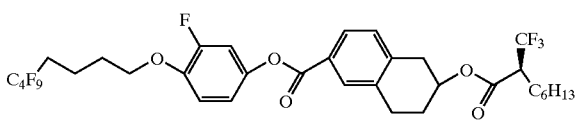

A presently preferred composition of the invention comprises a bistable host material and a compound of formula:

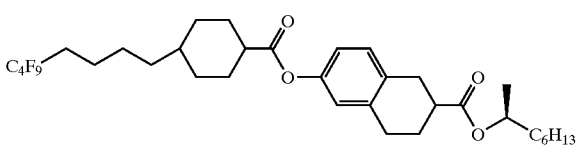

A presently preferred composition of the invention comprises a bistable host material and a compound of formula:

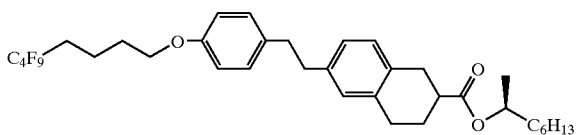

A presently preferred composition of the invention comprises a bistable host material and a compound of formula:

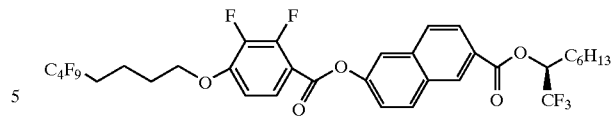

A presently preferred composition of the invention comprises a bistable host material and a compound of formula:

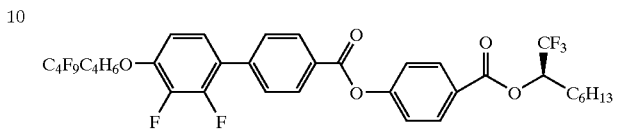

A presently preferred composition of the invention comprises a bistable host material and a compound of formula:

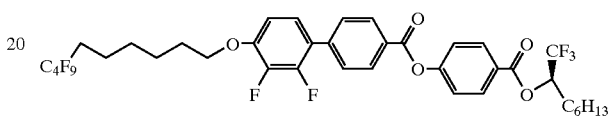

A presently preferred composition of the invention comprises a bistable host material and a compound of formula:

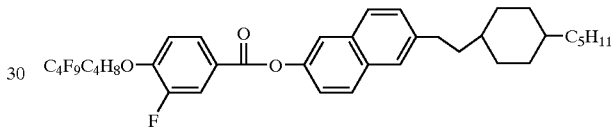

A presently preferred composition of the invention comprises a bistable host material and a compound of formula:

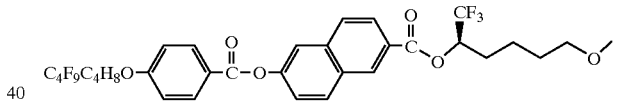

A presently preferred composition of the invention comprises a bistable host and a compound of formula MDW 1495 shown below.

Compositions of the invention contain one or more compounds disclosed herein in a bistable host, resulting in a composition that exhibits the desired properties. The compounds added to the bistable host may be present in the composition at a concentration of between about 2 and 100% by weight and all intermediate ranges therein, including between about 2% to about 35% by weight; between about 5% to about 20% by weight; between about 5% to about 50% by weight; and about 10% by weight. Preferably, the compound or compounds added to the bistable host are present in the composition at between about 5% and 15% by weight.

Provided are bistable FLC devices which comprise about 2% to about 100% by weight of one or more compounds of the invention in a bistable host material, and all intermediate ranges therein, including those ranges listed above. Napthalene-containing liquid crystals and non-naphthalene-containing liquid crystals may be present in the same device, providing that the device has the desired characteristics. These device may have other components as known in the art, as long as they do not interfere with the desired characteristics of the device. Preferably, the liquid crystal added to the bistable host is selected from the group consisting of:

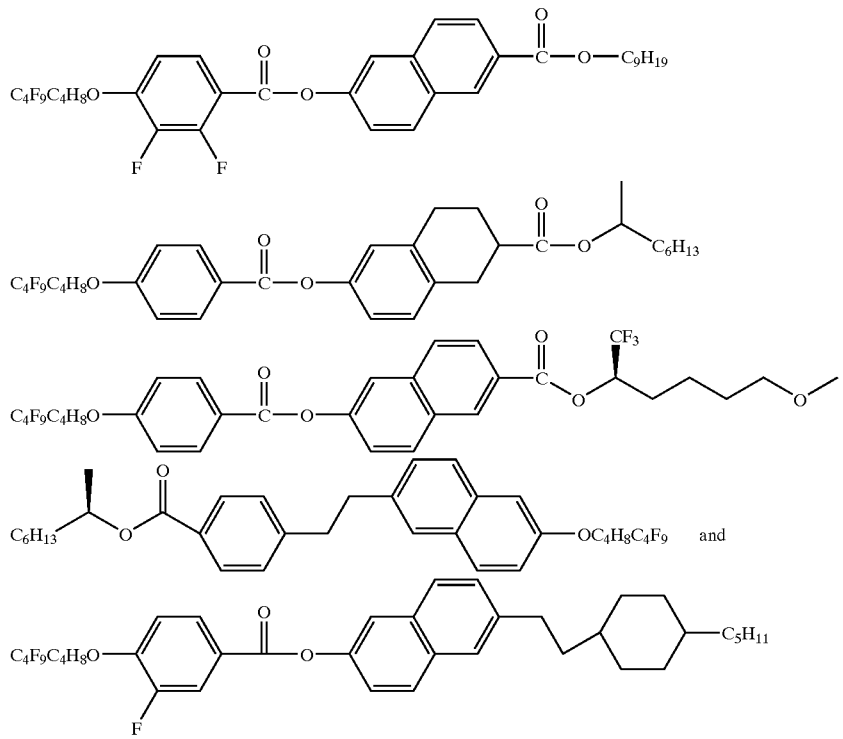

The bistable FLC devices of the invention have a switching angle greater than 15°; an A–C transition higher than 50° C.; and align with a contrast ratio greater than 20:1.

DETAILED DESCRIPTION OF THE INVENTION

Figure 1A:
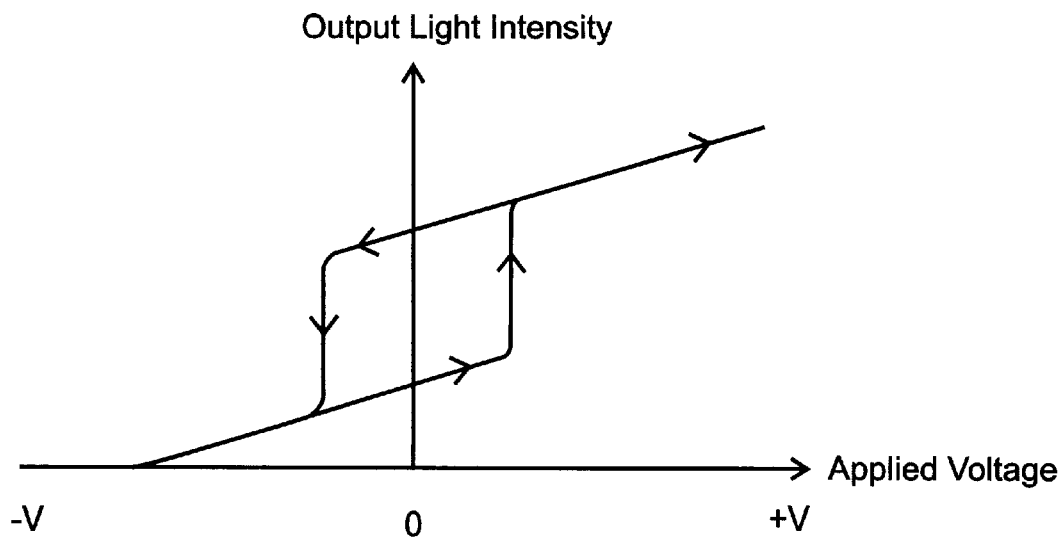
FIG. 1A is a schematic illustration of electrooptic response in a typical SSFLC bistable device.
Figure 1B:
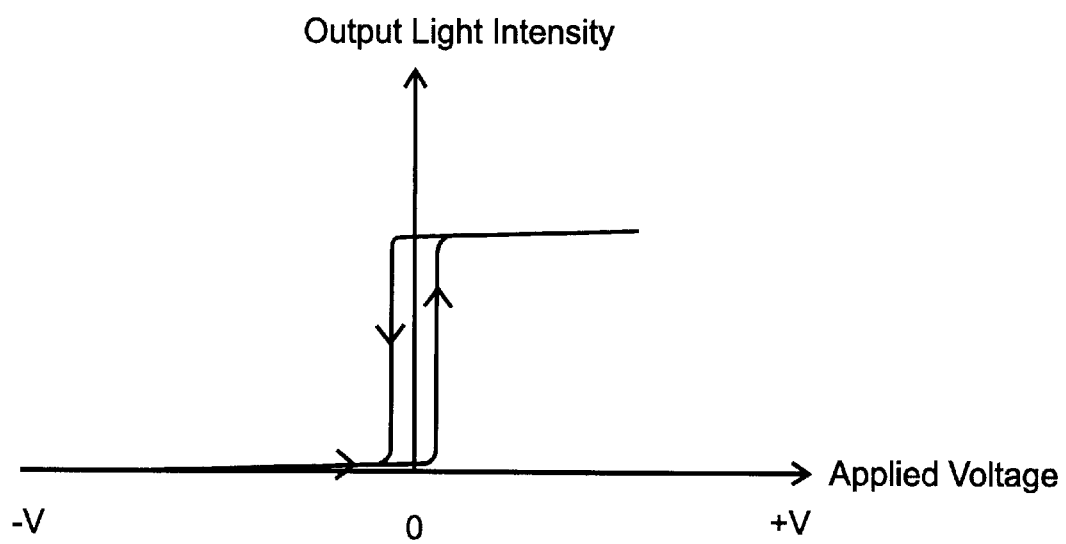
FIG. 1B is a schematic illustration of electrooptic response in a true bistable device with bookshelf layers.

As used herein, a bistable host is a compound or mixture of compounds that exhibits either true bistability i.e., which in the absence of an electric field, can be left indefinitely in either the on or off position with no measurable degradation of the contrast ratio, or partial bistability, where with no alignment layer or an alignment layer less than about 50 Å of PVA, polyimide or other materials known in the art, the bistability is greater than 50%.

Devices incorporating the compositions of the invention may be constructed as known in the art. For example, two substrates, at least one of which is coated with a polymer alignment layer (PVA, polyimide or other materials known in the art) and subsequently rubbed, are assembled to be parallel to form a liquid crystal cell. The gap of the cell is nominally thin and is typically less than 5 microns. The surfaces of the substrates are treated such that there is strong polar interaction, which in addition to proper choice of alignment materials, can often be obtained by increasing the thickness of the alignment layer between the surface and the ferroelectric liquid crystal.

One example of a bistable host is MX8870, shown below:

MX8870

Phase diagram: I 85.5 A 57.8

Ps=23.6 nC/cm$^2$

Birefringence $n_o$=1.6416, $n_e$=1.4893, ρn=0.152

In LV-050 cell at RT and 2.5 V/μm, 100 Hz

Switching angle=17.8°

Switching time=260 μs

MX8870

| No | Structure | Phase diagram | % |
|---|---|---|---|
| MTLC 06606 | C$_6$H$_{13}$—O—⟨⟩—⟨⟩—C(O)O—⟨⟨⟩⟩—OC$_6$H$_{13}$ | Cr ⇌ 103.5 / 78.2 C ⇌ 125/123.4 N ⇌ 181/180.3 Blue ⇌ 181.6/181 I;  Sx 78.5 | 5 |

-continued

| No | Structure | Phase diagram | % |
|---|---|---|---|
| MTLC 04212 | 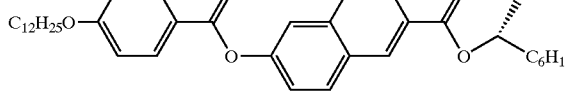 | Cr ⇌ 51 → A ⇌ 65/64.5 I<br><RT C 51.7 | 25 |
| MTLC 02009 | 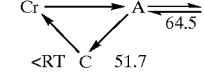 | Cr ⇌ 55/<RT C ⇌ 69.5/69 A ⇌ 104.5/103.9 I | 5 |
| MTLC 05311 | 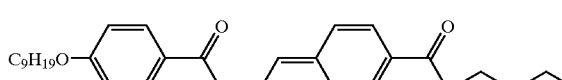 | Cr → 40.5 A ⇌ 50.2/50 I<br><RT C 34.5 | 5 |
| MTLC 03012 | 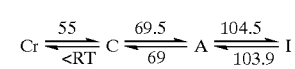 | Cr ⇌ 68/<RT C ⇌ 83/82.5 A ⇌ 99/98.6 I | 20 |
| MDW 158 | 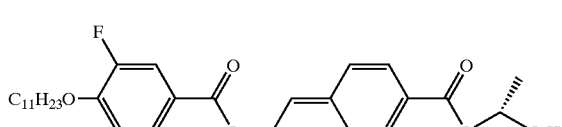<br>Racemate | Cr ⇌ 38/<RT C ⇌ 71.5/71.2 A ⇌ 74.7/74.3 I | 40 |

Addition of 10% of the structures listed below to MX8870 resulted in the following results:

| MDW | structure | Phase diagram (neat) | Phase diagram (10% in MX 8870) | θ (°) | τ (µs) |
|---|---|---|---|---|---|
| 1449 | 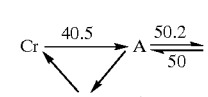 | X ⇌ 73/113 A ← 227 I | I 101.6 A 62 C | 18.4 | 383 |
| 1386 | 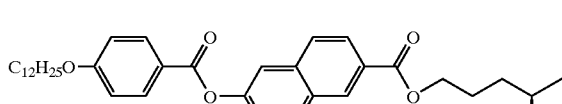 | X ⇌ 70/89 I | I 83 A 60.6 C | 20.5 | 260 |
| 1372 | 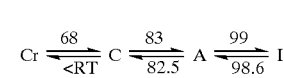 | X ⇌ 45 Sx ⇌ <RT/46 I | I 82.2 A 58.3 C | 21.3 | 320 |
| 1418 | 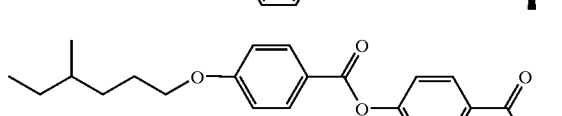 | X ⇌ 66/93 C ← 123 A ← 137.5 I | I 90.2 A 67 C | 19.3 | 480 |
| 1481 | 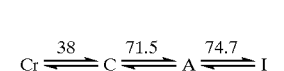 | X ⇌ 56/<RT C ⇌ 40.5 A ⇌ 43.3 I | I 82 A 58.8 C | 21.1 | 270 |

TABLE 1

Naphthalene type bistable mixtures

| MX | Composition | Phase diagram (° C.) | Ps (nC/cm2) | Square wave 2.5 V/cm, 100 Hz θ(°) | Square wave 2.5 V/cm, 100 Hz τ(μs) | Pulse wave 5 V/cm, 100 Hz, 500 μs θ(°) | Pulse wave 5 V/cm, 100 Hz, 500 μs τ(μs) |
|---|---|---|---|---|---|---|---|
| 8870 | MTLC-06606 (5%), MTLC-04212 (25%), MTLC-02009 (5%), MTLC-05311 (5%), MTLC-03012 (20%), MDW158 (40%) | I 85.5 A 58 C | 24 | 17.3 | 360 | | |
| 9045 | MX8870 (34.7%), MDW1480 (32.1%), MDW1481 (33.2%) | I 59 A 52.7 C | 119.3 | 30.6 | 370 | Good Bistability in type 4 | |
| 9061 | MDW 158 (30%), MDW1449 (5%), MDW1384 (5%), MDW1424 (10%), MDW1418 (10%), MDW1386 (10%), MDW1372 (10%), MDW1481 (10%), MDW1485 (10%) | I 86 A 60.6 C | 54 | 29 | 265 | | |
| 9063 | MX9061 (70%), MDW1484 (10%), MTLC-03012 (20%) | I 89 A 67.5 C | 39 | 27.1 | 439 | | |
| 9064 | MDW1386 (15%), MDW1449 (10%), MDW1384 (10%), MDW1481 (15%), MDW158 (30%), MTLC-03012 (20%) | I 95 A 70.1 C | 38.7 | 25.3 | 220 | | |
| 9065 | MX8870 (80%), MDW1386 (10%), MDW1424 (10%) | I 88 A 67.4 C | 38.8 | 22.2 | 270 | 18 | 120 |
| 9071 | MX8870 (81.3%), MDW966 (9.3%), MDW1386 (9.4%) | I 87.8 A 68 C | 39.6 | 22.4 | 245 | 18.2 | 95 |
| 9072 | MDW1384 (10%), MDW1386 (20%), MDW158 (25%), MTLC-03012 (25%), MTLC-02009 (15%), MDW966 (5%) | I 91.8 A 68 C | 28.7 | 22 | 270 | 16.7 | 120 |
| 9076 | MX9072 (90%), MDW1497 (10%) | I 95 A 66.5 C | 35 | 22.5 | 215 | 17.2 | 98 |
| 9077 | MX9071 (90%), MDW1497 (10%) | I 93 A 68.5 C | 47.7 | 23.1 | 190 | 16.5 | 85 |
| 9079 | MX9065 (70%), MDW1497 (30%) | I 98 A 74 C | 75.5 | 26.1 | 231 | 16.3 | 120 |
| 9093 | MTLC-04212 (45.4%), MTLC-02009 (9.1%), MTLC-05311 (10%), MTLC-03012 (35.3%). | I 81 A 63 C | 50.5 | 22.5 | 420 | | |
| 9094 | Achiral MDW966, 1040, 1026, 1269, and 1270. Each 20%. | I 149 A 141.5 C 60 S$_I$ ? Cr | | | | | |
| 9095 | MX9093 (60%), MX9094 (40%) | I 111 A 95 C | 30.8 | | | | |
| 9096 | MDW1386(10%), MX9095 (90%) | I 105 A 85 C | 45.7 | | | | |
| 9101 | MX9093 (68%), MDW966 (8.5%), MDW1040 (15%), MDW536 (8.5%) | I 93 A 76 C | 34.5 | | | | |
| 9104 | MTLC-03012 (15%), MDW1397 (35%), MDW336(10%), MDW1537 (5%), MDW1040 (10%), MDW1498 (5%), MDW3 (10%), MDW4 (10%) | I 101 A 54 C | 17 | 13 | | | |
| 9105 | MDW1511 (20%), MDW1386 (15%), MTLC-03012 (20%), MTLC-02009 (10%), MDW1040 (15%), MDW1026 (10%), MDW1383 (10%) | I 97 A 79.5 C | 54.2 | 30.7 | 250 | | |
| 9106 | MDW1511 (25%), MTLC-03012 (20%), MTLC-02009 (15%), MDW1040 (15%), MDW1383 (15%), MDW1026 (10%) | I 99 A 86 C | 31.7 | 28 | 280 | | |
| 9107 | MDW1372 (25%), MTLC-03012 (20%), MTLC-02009 (10%), MTLC-06606 (5%), MDW1441 (5%), MDW1026 (10%), MDW1040 (10%), MDW336 (5%). | I 104.5 A 81.5 C | 38.3 | 27.5 | 450 | | |
| 9108 | MDW1229 (25%), MTLC-03012 (20%), MTLC-02009 (10%), MTLC-06606 (5%), MDW1441 (15%), MDW1026 (5%), MDW1040 (5%), MDW336 (15%) | I 93 A 60 C~RT Cr | 31.7 | | | | |

TABLE 1-continued

Naphthalene type bistable mixtures

| MX | Composition | Phase diagram (° C.) | Ps (nC/cm2) | Square wave 2.5 V/cm, 100 Hz | | Pulse wave 5 V/cm, 100 Hz, 500 µs | |
|---|---|---|---|---|---|---|---|
| | | | | θ(°) | τ(µs) | θ(°) | τ(µs) |
| 9112 | MDW1229 (12%), MTLC-04212 (18%), MTLC-03012 (20%), MTLC-02009 (5%), MTLC-06606 (5%), MDW1441 (15%), MDW1026 (6%), MDW1040 (7%), MDW336 (12%) | I 95 A 68 C | 30.3 | 22.6 | 223 | 14 | 115 |
| 9113 | MDW1546 (15%), MTLC-04212 (15%), MTLC-03012 (20%), MTLC-02009 (5%), MTLC-06606 (5%), MDW1441 (15%), MDW1040 (15%), MDW336 (10%) | I 97 A 82 C | 37.1 | 26.6 | 140 | 11.5* | 88* |
| 9115 | MDW1546 (10%), MTLC-06606 (5%), MTLC-04212 (25%), MTLC-02009 (5%), MTLC-05311 (5%), MTLC-03012 (20%), MDW1441 (15%), MDW1040 (15%) | I 94 A 79 C | 50.9 | 26 | 420 | | |
| 9120 | MTLC-04212 (25%), MTLC-05311 (5%), MTLC-03012 (20%), MTLC-02009(15%), MDW158 (35%) | I 83 A 56 C | 22.1 | | | | |
| 9121 | MX9115(90%), MDW1331 (10%) | I 108–92 A 78 C | 43.4 | 25 | 170 | | |
| 9123 | MDW1546 (5%), MTLC-06606 (5%), MTLC-04212 (25%), MTLC-02009 (5%), MTLC-05311 (5%), MTLC-03012 (20%), MDW1441 (15%), MDW1331 (10%), MDW1269 (10%) | I 103–95 A 68 C | 32.3 | 21.7 | | | |
| 9124 | MDW1546 (5%), MTLC-06606 (5%), MTLC-04212 (25%), MTLC-02009 (5%), MTLC-05311 (5%), MTLC-03012 (20%), MDW1441 (15%), MDW1331 (10%), MDW966 (5%), MDW1269 (5%) | I 105–94 A 71 C | 35 | 21.5 | | | |
| 9128 | MDW1558 (67.3%), MDW1559 (20.4%), MDW950 (12.3%) | I 93.6–91 A 84 C | 49.5 | 27 | 47 | | |
| 9130 | MDW1562 (70%), MDW1564 (20%), MDW950(10%) | I 59.5 C | 33.4 | | | | |
| 9131 | MDW1566 (15%), MDW1441 (15%), MDW966 (10%), MDW1537 (10%), MDW1245 (20%), MDW1498 (10%), MDW1546 (10%), MDW1251 (10%) | I 103–84 A 73 C | 48.4 | 26 | 120 | | |
| 9133 | MDW1456 (5%), MTLC-06606 (5%), MTLC-04212 (25%), MTLC-02009 (5%), MTLC-05311 (5%), MTLC-03012 (20%), MDW1441 (15%), MDW1331 (10%), MDW1269 (10%) | I 103–95 A 68 C | 32.3 | 21.1 | 144 | 16.7 | 151 |
| 9134 | MDW1546 (5%), MTLC-06606 (5%), MTLC-04212 (25%), MTLC-02009 (5%), MTLC-05311 (5%), MTLC-03012 (20%), MDW1441 (15%), MDW1331 (10%), MDW1269 (5%), MDW966 (5%) | I 105–94 A 71 C | 35 | 20.8 | 160 | 16.4 | 164 |

*measured in 1.8 micron glass/glass cell at RT

TABLE 2

Bistable mixtures Composition

MDW

| MX | 1396 | 1397 | 1498 | 959 | 1441 | 1568 | 538 | 1567 | 1290 | 987 | MTLC 0312 | A-2028 | A-2032 | 1591 | 1595 | 1586 | 1596 | 1608 | 1632 |
|---|---|---|---|---|---|---|---|---|---|---|---|---|---|---|---|---|---|---|---|
| 9136 | 10 | 20 | 15 | 10 | 10 | 10 | 21 | 4 | | | | | | | | | | | |
| 9136 | 8.5 | 17 | 12. | 8.5 | 8.5 | 8.5 | 17. | 3.4 | 15 | | | | | | | | | | |
| 9137 | 15 | 25 | 5 | 15 | 10 | 5 | 15 | 5 | 5 | | | | | | | | | | |
| 9149 | 10 | 20 | 10 | 10 | 15 | | 15 | | 10 | 10 | | | | | | | | | |
| 9157 | 10 | 15 | 10 | 10 | 15 | 10 | 10 | | | | 10 | 10 | | | | | | | |
| 9159 | 9 | 13. | 9 | 9 | 13. | 9 | 9 | | 10 | | 9 | 9 | | | | | | | |
| 9163 | 10 | 20 | 5 | 10 | 15 | | 15 | | 10 | | | | 10 | 5 | | | | | |
| 9165 | 9.5 | 19 | 4.7 | 9.5 | 14. | | 14. | | 9.5 | | | | 9.5 | 4.7 | 5 | | | | |
| 9166 | 9 | 18 | 4.5 | 9 | 13. | | 13. | | 9 | | | | 9 | 4.5 | 10 | | | | |
| 9170 | 10 | 20 | | 10 | 12 | | 15 | | 10 | | | | 7 | | | 8 | | 8 | |
| 9171 | 9 | 18 | | 9 | 10. | | 13. | | 9 | | | | 6.3 | | 10 | 7.2 | | 7.2 | |
| 9172 | 7 | 8 | | 10 | 10 | | 15 | | 12 | | | | | | 15 | 5 | 10 | 8 | |
| 9173 | 6.7 | 12. | | 9.5 | 9.5 | | 14. | | 11. | | | | | | 14. | 4.8 | 9.5 | 7.6 | |
| 9195 | 10 | 15 | | 10 | 12 | | 13 | | 12 | | | | 7 | | 15 | | 6 | | |
| 9196 | 10 | 15 | | 10 | 10 | | 15 | | 10 | | | | 9.1 | | 10. | | 5.8 | 4.4 | |
| 9197 | 10 | 15 | | 10 | 8 | | 10 | | 10 | | | | 7 | | 10 | | 5 | 5 | 10 |
| 9198 | 8 | 16 | | 8 | 9.6 | | 12 | | 8 | | | | 5.6 | | 10 | 6.4 | | 6.4 | 10 |

TABLE 3

Electrooptical property

| | | | | LV-050 at RT | | | |
|---|---|---|---|---|---|---|---|
| | | | | Square wave 2.5 V/μm, 100 Hz | | Pulse wave 5 V/μm, 100 Hz, 400 μs | |
| MX | Phase diagram (° C.) | Electric rise time (μs) | Viscosity (mP*S) | Ps (nC/cm²) | θ | τ | θ | τ |
| 9136 | I 91–87 A 70.5 C | 437 | 477 | 32.7 | 27.8 | 220 | 18 | 130 |
| 9136y | I 94–91 A 68.5 C | 160 | 290 | 49.2 | 22.9 | 180 | 15.5 | 115 |
| 9137 | I 95–92 A 72 C | 230 | 464 | 54.6 | 26.7 | 131 | 15.2 | 80 |
| 9149 | I 95–93 A 69.5 C | 265 | 435 | 47 | 26.5 | 140 | 13 | 70 |
| 9157 | I 95–93 A 77 C | 335 | 318 | 27 | 26 | 210 | 16 | 90 |
| 9159 | I 96–94.5 A 74 C | 202 | 282 | 38.7 | | | | |
| 9163 | I 93.7–89 A 67 C | 125 | 213 | 40.3 | 22.4 | 120 | | |
| 9165 | I 94–90 A 70.5 C | 135 | 214 | 40.5 | 23 | 123 | | |
| 9166 | I 92–88 A 71.5 C | 135 | 200 | 39 | 23.5 | 133 | 14.3 | 62 |
| 9170 | I 94.5–92 A 71 C | 150 | 233 | 43 | 23.1 | 120 | 15.5 | 56 |
| 9171 | I 93–90.5 A 73.5 C | 165 | 282.6 | 40.9 | 23.7 | 123 | 16.4 | 60 |
| 9172 | I 93.6–91.5 A 75.5 | 125 | 190 | 33 | 22.9 | 127 | 14.4 | 65 |
| 9173 | I 93.5–91 A 74.5 C | 127 | 186 | 34.5 | 23.5 | 126 | 15.2 | 58 |
| 9195 | I 95–93.5 A 77 C | 110 | 214 | 45.5 | 23.8 | 85 | | |
| 9196 | I 93.7–91.5 A 72 C | 105 | 159 | 36.7 | 22.4 | 144 | 17 | 55 |
| 9197 | I 93.7–91.5 A 66.5 | 112 | 134 | 31.4 | 19.5 | 120 | | |
| 9198 | I 93.5–91.5 A 72.5 | 162 | 206 | 34.7 | 23.7 | 210 | | |

Other bistable host compositions are useful, as well. Other bistable host compositions are known in the art.

Following are the structures corresponding to the abbreviations used.

TABLE 4

MPW structures

MDW NUMBER STRUCTURE

1480

TABLE 4-continued
MPW structures
| MDW NUMBER | STRUCTURE |
|---|---|
| 1481 | 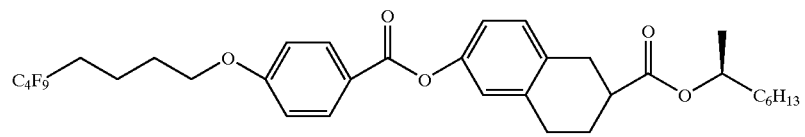 |
| 158 | 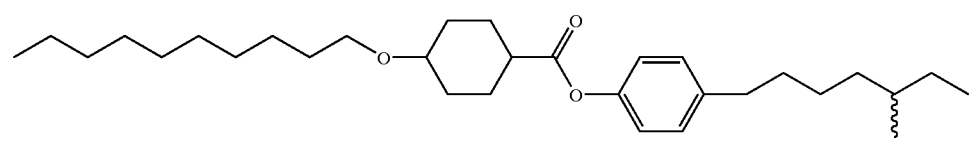 |
| 1449 | 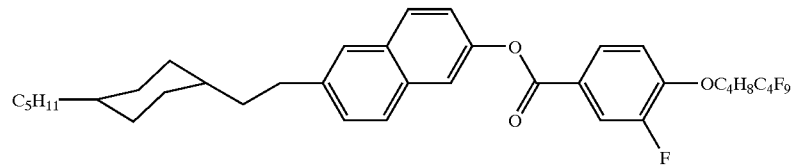 |
| 1384 | 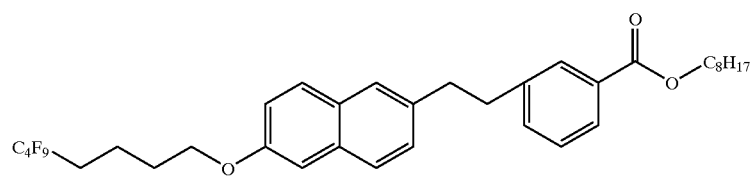 |
| 1484 | 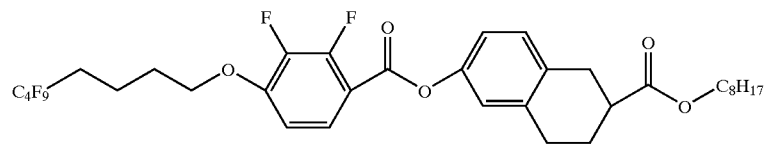 |
| 1386 | 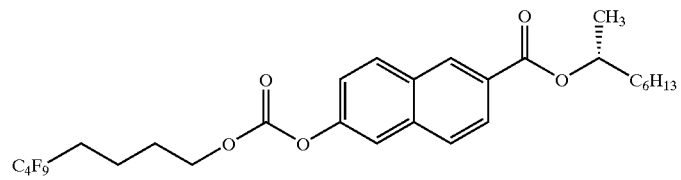 |
| 1424 | 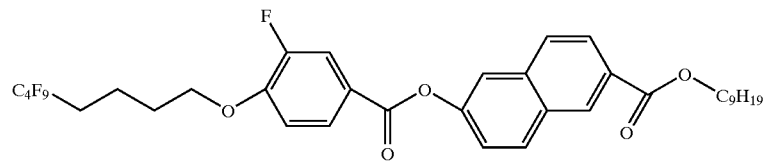 |

TABLE 4-continued

MPW structures

| MDW NUMBER | STRUCTURE |
|---|---|
| 1372 | |
| 1229 | |
| 1546 | |
| 1331 | |
| 1558 | |
| 950 | |
| 1562 | |
| 1566 | |
| 1441 | |
| 1456 | |

TABLE 4-continued
MPW structures
| MDW NUMBER | STRUCTURE |
|---|---|
| 139 | 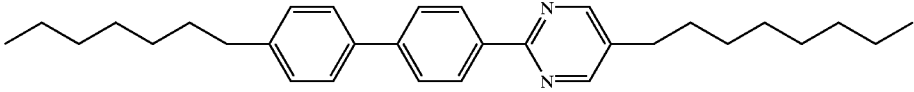 |
| 1498 | 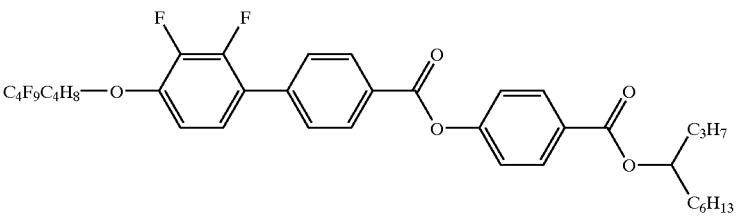 |
| 959 | 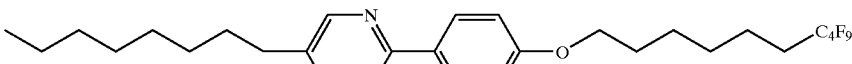 |
| 144 | 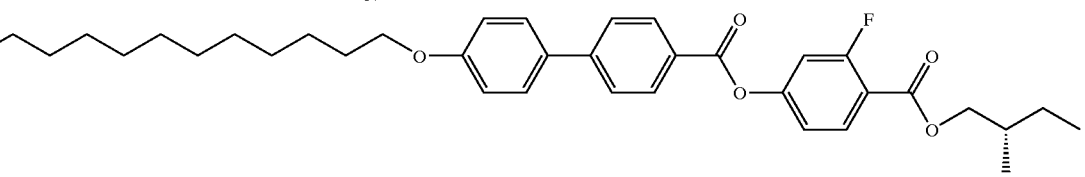 |
| 156 | 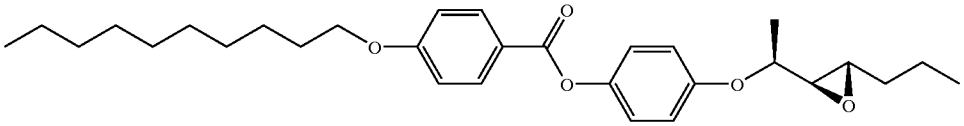 |
| 538 | 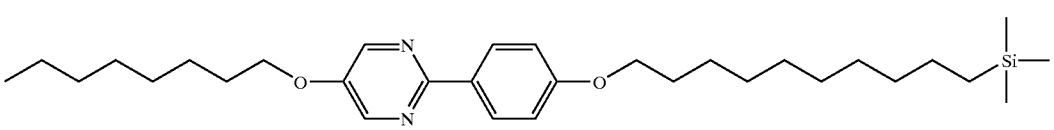 |
| 129 | 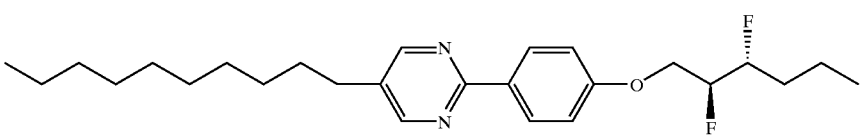 |
| 98 | 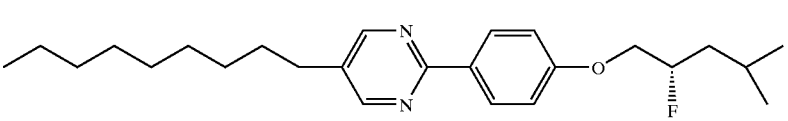 |
| 966 | 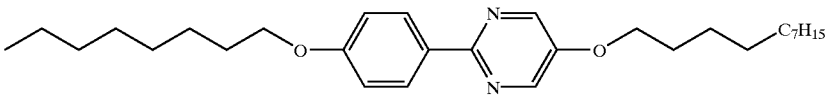 |
| 1384 | 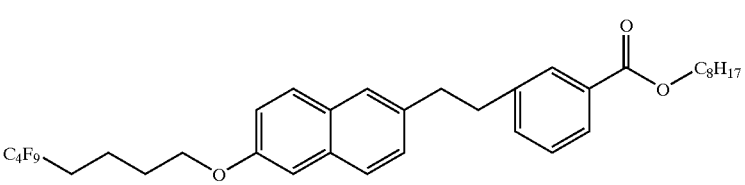 |

TABLE 4-continued

MPW structures

| MDW NUMBER | STRUCTURE |
|---|---|
| 1497 | $C_4F_9C_4H_8$—O—[2,3-difluorobiphenyl]—C(=O)O—[phenyl]—C(=O)O—CH(CH₃)—(CH₂)₄—Si(CH₃)₂—O—Si(CH₃)₃ |
| 1040 | $C_4F_9C_4H_8O$—[pyrimidine]—[phenyl]—O—(CH₂)₇—CH(C₂H₅)—C₂H₅ |
| 1026 | $C_4F_9C_4H_8O$—[pyrimidine]—[phenyl]—O—C(=O)—[cyclohexenyl]—(CH₂)₂—CH=C(CH₃)₂ |
| 1269 | $C_{10}H_{21}$—[pyrimidine]—[phenyl]—O—C(=O)—[cyclohexenyl]—$C_4H_8C_4F_9$ |
| 1397 | $C_4F_9C_6H_{12}O$—[2,3-difluorobiphenyl]—C(=O)O—[phenyl]—C(=O)O—CH(CF₃)—C₆H₁₃ |
| 336 | C₁₀H₂₁—[pyrimidine]—[phenyl]—O—C(=O)—[cyclohexenyl]—(CH₂)₂—CH=C(CH₃)₂ |
| 1564 | $C_{10}H_{21}$—[pyrimidine]—[phenyl]—O—(CH₂)₅—CH=CH—Si(CH₃)₃ |
| MTLC-04212 | $C_{12}H_{25}$—O—[phenyl]—C(=O)O—[naphthyl]—C(=O)O—CH(CH₃)—C₆H₁₃ |
| 1559 | $C_{10}H_{21}$—[pyrimidine]—[phenyl]—O—(CH₂)₈—Si(CH₃)₂—CH₂—Si(CH₃)₃ |

TABLE 4-continued
MPW structures
| MDW NUMBER | STRUCTURE |
|---|---|
| 1248 | 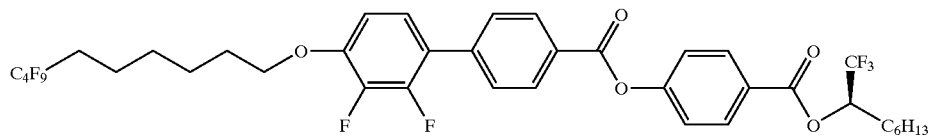 |
| 1228 | 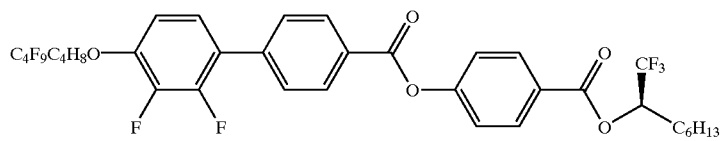 |
| 1511 | 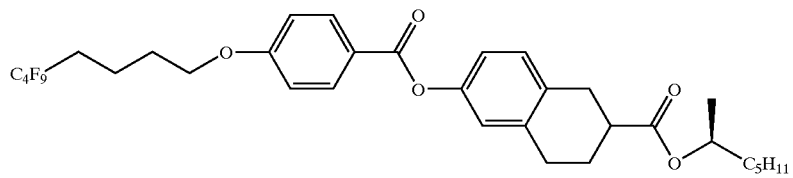 |
| 1537 | 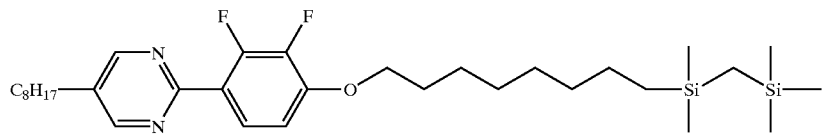 |
| 1245 | 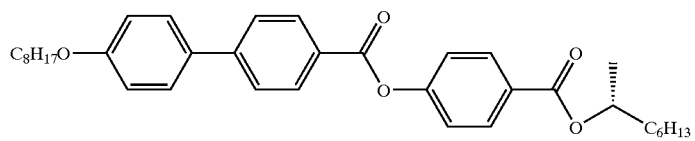 |
| 1251 | 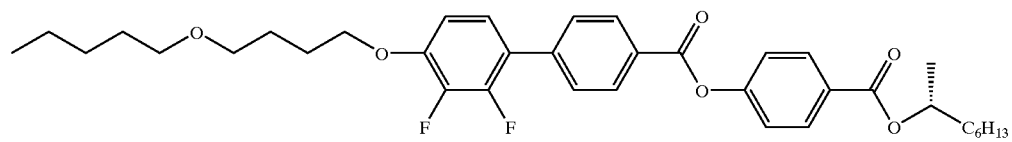 |
| 1383 | 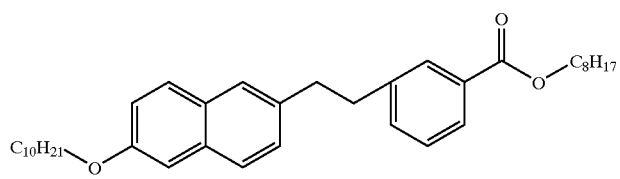 |

TABLE 4-continued
MPW structures
| MDW NUMBER | STRUCTURE |
|---|---|
| 536 | 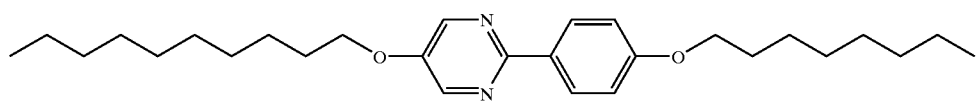 |
| 1537 | 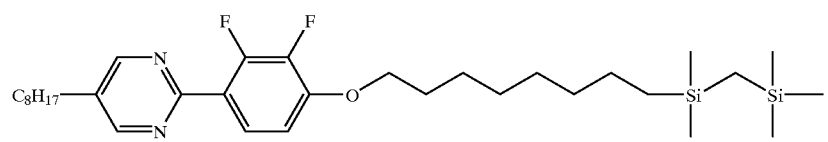 |
| 3 | 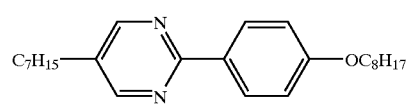 |
| 4 | 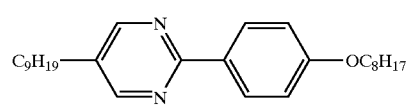 |
| 1270 | 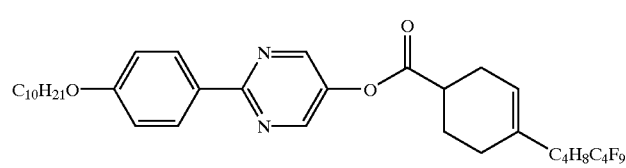 |
| 1418 | 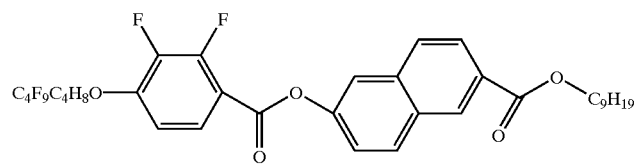 |
| 1485 | 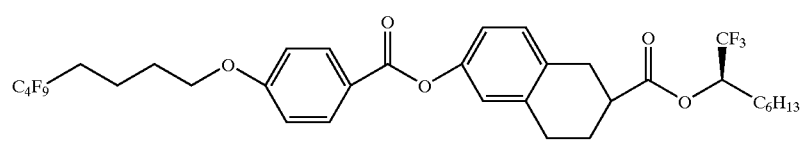 |
| 1396 | 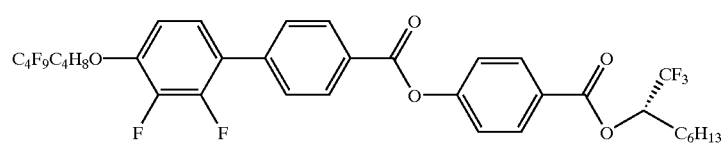 |
| 1568 | 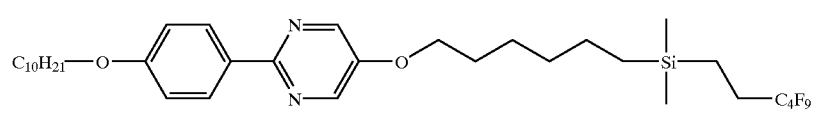 |
| 1567 | 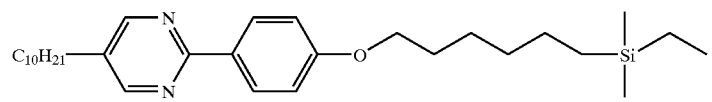 |

TABLE 4-continued

MPW structures

| MDW NUMBER | STRUCTURE |
|---|---|
| 1290 | $C_8H_{17}$—[phenyl]—[pyridyl-N]—O—CH$_2$—CHF—CHF—$C_5H_{11}$ (stereochemistry shown with wedge bonds) |
| 987 | $C_4F_9C_4H_8O$—[pyrimidinyl]—[phenyl]—O—CH$_2$—C*(CH$_3$)(F)—$C_5H_{11}$ |
| 1795 (A2028) | $C_{10}H_{21}$—[pyrimidinyl]—[phenyl]—$OC_8H_{17}$ |
| 1744 (A2032) | $C_{10}H_{21}$—[pyrimidinyl]—[phenyl]—$OC_{12}H_{25}$ |
| 1591 | $C_{10}H_{21}$—[pyrimidinyl]—[phenyl]—O—(CH$_2$)$_3$—Si(CH$_3$)$_2$—CH$_2$CH$_2$—$CF_3$ |
| 1595 | $C_4F_9$—C(=O)—O—(CH$_2$)$_6$—O—[pyrimidinyl]—[phenyl]—O—$C_{10}H_{21}$ |
| 1586 | $C_4F_9C_4H_8O$—[pyrimidinyl]—[phenyl]—O—(CH$_2$)$_7$—Si(CH$_3$)$_2$—CH$_2$—Si(CH$_3$)$_3$ |
| 1596 | $C_{10}H_{21}$—[pyrimidinyl]—[phenyl]—O—$C_6H_{12}$—O—C(=O)—$C_4F_9$ |
| 1608 | $C_{10}H_{21}$—[pyrimidinyl]—[phenyl]—O—$C_4H_8$—Si(CH$_3$)$_2$—CH$_2$CH$_2$—$C_6F_{13}$ |
| 1632 | $C_{10}H_{21}O$—[pyrimidinyl]—[phenyl]—O—(CH$_2$)$_3$—Si(CH$_3$)$_2$—CH$_2$CH$_2$—$C_6F_{13}$ |

The preparation and use of devices incorporating the liquid crystal compounds and compositions of the invention are well known in the art.

SYNTHESIS EXAMPLES

Example synthesis for several compounds of the invention appears below. Synthesis of other compounds proceeds through analogous methods, or methods known in the art without undue experimentation by one of ordinary skill in the art. Synthesis of the compounds in the bistable mixtures is known to one of ordinary skill in the art.

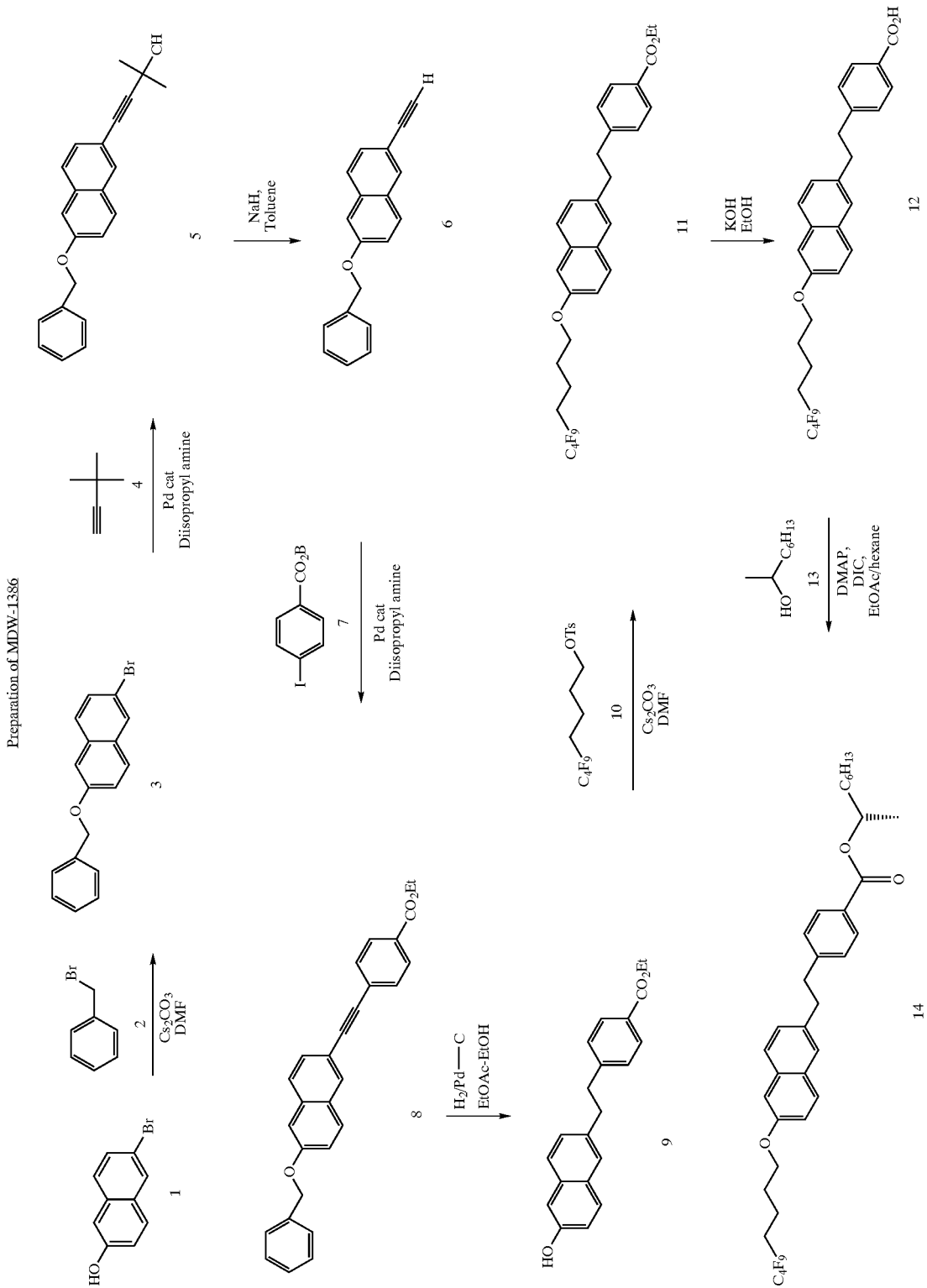

Scheme-1: Synthesis of 4-{2-[6-(5,5,6,6,7,7,8,8,8-Nonafluoro-octyloxy-naphthalene-2-yl]-ethyl}-benzoic Acid (R)-1-Methyl-heptyl Ester (14) (MDW-1386)

2-Benzyloxy-6-bromo-naphthalene (3)

To the commercially available 6-bromo-naphthalene-2-ol (1) (1 equi.) and benzyl bromide (2) (1 equi.) in DMF (3mL/mmole), cesium carbonate (1.25 equi.) was added at room temperature. The reaction mixture was stirred at that temperature for 24 h, quenched with water, extracted with ethyl acetate:hexane (1:1), washed with brine, over MgSO4, and concentrated in vacuo.

Purification by chromatography on silica gel (5% EtOAc/hexanes) and recrystallization from acetonitrile afforded 2-benzyloxy-6-bromo-naphthalene (3), a white solid (91%)

4-(6-Benzyloxy-naphthalene-2-yl)-2-methyl-butyl-3-yn-2-ol (5)

Nitrogen gas was bubbled through the solution of 2-benzyloxy-6-bromo-naphthalene (3) (1 equi.) and 2-methyl-3-butyn-2-ol (4) (1.2 equi.) in diisopropylamine (15 mL/mmole) for 15 min. Pd catalyst (0.01 equi.) was added to the reaction mixture and nitrogen bubbling was continued for another 15 min. The reaction mixture was stirred at 80 C for 15 h, cooled to room temperature, quenched with water, extracted with ethyl acetate:hexane (1:1), washed with brine, dried over MgSO4, and concentrated in vacuo. Purification by chromatography on silica gel (50% EtOAc/hexanes) and recrystallization from hexane afforded 4-(6-benzyloxy-naphthalene-2-yl)2-methyl-butyl-3-yn-2-ol (5) a white solid (96%).

2-Benzyloxy-6-ethynyl-naphthalene (6)

Sodium hydride (0.2 equi.) was added to the solution of 4-(6-benzyloxy-naphthalene-2-yl)-2-methyl-butyl-3-yn-2-ol (5) (1 equi.) in toluene (10 mL/mmole) and the reaction mixture was stirred at 120 C for 1 h while half of the toluene was distilled from the reaction mixture. The reaction mixture was cooled to room temperature, passed through 2" silica gel plug, concentrated in vacuo to give pure 2-benzyloxy-6-ethynyl-naphthalene (6) a yellow solid (93%).

4-(6-Benzyloxy-naphthalene-2-ylethynyl)-benzoic Acid Ethyl Ester (8)

Nitrogen gas was bubbled through a solution of 2-benzyloxy-6-ethynyl-naphthalene (6) (1 equi.) and commercially available 4-iodo-benzoic acid ethyl ester (7) (1 equi.) in diisopropylamine (15 mL/mmole) for 15 min. Pd catalyst (0.01 equi.), prepared as described in (1), was added to the reaction mixture and nitrogen bubbling was continued for another 15 min. The reaction mixture was stirred at 80 C for 15 h and cooled to room temperature. A white solid separated. The white solid was further purified by chromatography on silica gel (THF) and recrystallized from acetonitrile to give 4-(6-benzyloxy-naphthalene-2-ylethynyl)-benzoic acid ethyl ester (8) a white solid (93%).

4-[2-(6-Hydroxy-naphthalene-2-yl)-ethynyl]-benzoic Acid Ethyl Ester (9)

The solution of 4-(6-benzyloxy-naphthalene-2-ylethynyl)-benzoic acid ethyl ester (8) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen for 14 h. The reaction mixture passed through 2" celite-silica gel plug to remove catalyst, concentrated in vacuo and recrystallized from acetonitrile-ethanol (3:1) to give pure 4-[2-(6-hydroxy-naphthalene-2-yl)-ethynyl]-benzoic acid ethyl ester (9) as a brown solid (91%).

4-{2-[6-(5,5,6,6,7,7,8,8,8-Nonafluoro-octyloxy-naphthalene-2-yl]-ethyl}-benzoic Acid Ethyl Ester (11)

To the solution of 4-[2-(6-hydroxy-naphthalene-2-yl)-ethynyl]-benzoic acid ethyl ester (9) (1 equi.) and 4-(5,5,6,6,7,7,8,8,8-nonafluoro-octyloxy)-tosylate (10), prepared as described in (2), (1 equi.) in DMF (3 mL/mmole), cesium carbonate (1.25 equi.) was added at room temperature. The reaction mixture was stirred at that temperature for 24 h, quenched with water, extracted with ethyl acetate:hexane (1:1), washed with brine, dried over MgSO4, and concentrated in vacuo. Purification by chromatography on silica gel (10% EtOAc/hexanes) afforded 4-{2-[6-(5,5,6,6,7,7,8,8,8-nonafluoro-octyloxy-naphthalene-2-yl]-ethyl}-benzoic acid ethyl ester (11) a white solid (90%).

4-{2-[6-(5,5,6,6,7,7,8,8,8-Nonafluoro-octyloxy-naphthalene-2-yl]-ethyl}-benzoic Acid (12)

The solution 4-{2-[6-(5,5,6,6,7,7,8,8,8-nonafluoro-octyloxy-naphthalene-2-yl]-ethyl}-benzoic acid ethyl ester (11) (1 equi.) and potassium hydroxide (3.5 equi.) in water-ethanol (1:1) (25 mL/mmole) was stirred at 80 C temperature for 2 h., cooled to room temperature, quenched with hydrochloric acid (5%). The resulting white solid was filtered, washed with water, and dried under vacuum to give 4-{2-[6-(5,5,6,6,7,7,8,8,8-nonafluoro-octyloxy-naphthalene-2-yl]-ethyl}-benzoic acid (12) as a white solid (85%).

4-{2-[6-(5,5,6,6,7,7,8,8,8-Nonafluoro-octyloxy-naphthalene-2-yl]-ethyl}-benzoic Acid (R)-1-Methyl-heptyl Ester (14)

To the solution of 4-{2-[6-(5,5,6,6,7,7,8,8,8-nonafluoro-octyloxy-naphthalene-2-yl]-ethyl}-benzoic acid (12) (1 equi.), (R)-2-octanol (13) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (3% EtOAc/hexanes) and recrystallization from hexane 4-{2-[6-(5,5,6,6,7,7,8,8,8-nonafluoro-octyloxy-naphthalene-2-yl]-ethyl}-benzoic acid (R)-1-methyl-heptyl ester (14) a white solid (33%).

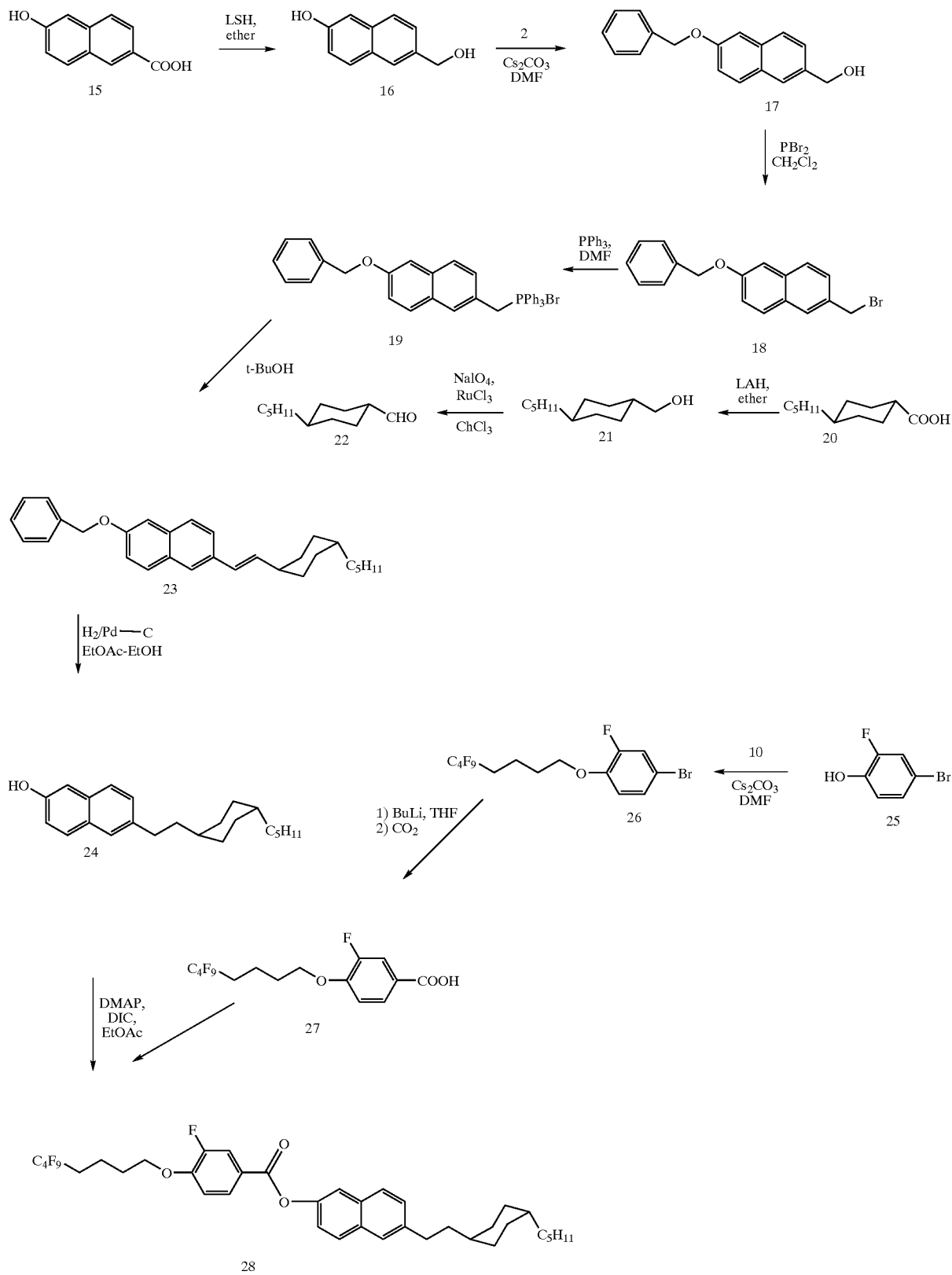
Preparation of MDW-1449

Scheme-2: 3-Fluoro-4-(5,5,6,6,7,7,8,8,8-nonafluoro-octyloxy)-benzoic Acid 6-[2-(4-Pentyl-cyclohexyl)-ethyl-naphthalen-2-yl Ester (28) (MDW-1449)

6-Hydroxy Methyl-naphthalen-2-ol (16)

To the slurry of lithium aluminum hydride (2 equi.) in THF (3 mL/mmole), a solution of 6-hydroxy-naphthalene-2-carboxylic acid (15) (1 equi.) in THF (3 ml/mmole) was added at ice temperature over a period of 20 min. The reaction mixture was stirred at room temperature for 24 h, cooled to ice temperature, added diethyl ether (20 mL/mmole), quenched slowly with water (1 mL/g LAH), 15% aqueous sodium hydroxide (1 mL/g LAH), and water (3 mL/g LAH) succesively. MgSO4 (5 g/100 mL reaction solution) was added to the reaction mixture, stirred for 30 min, filtered through celite, and concentrated in vacuo to give 6-hydroxy methyl-naphthalen-2-ol (16), a white solid (79%).

(6-Benzyloxy -naphthalen-2-yl)-methanol (17)

To a solution of 6-hydroxy methyl-naphthalen-2-ol (16) (1 equi.) and benzyl bromide (2) (1 equi.) in DMF (3 mL/mmole), cesium carbonate (1.25 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (20% THF/hexanes) and recrystallization from EtOAc-Hexane (1:2) afforded (6-benzyloxy-naphthalen-2-yl)-methanol (17) a white solid (88%).

2-Benzyloxy-6-bromomethyl-naphthalen (18)

To a solution of (6-benzyloxy-naphthalen-2-yl)-methanol (17) (1 equi.) in CH2Cl2 (4 mL/mmole), a solution of phosphorus tribromide (4 mL/mmole), (0.4 equi.) was added at room temperature. The reaction mixture was stirred at that temperature for 24 h, quenched with water, extracted with dichloromethane, washed with brine, dried over MgSO4, and concentrated in vacuo. Purification by chromatography on silica gel (dichloromethane) and recrystallization from acetonitrile afforded 2-benzyloxy-6-bromomethyl-naphthalene (18) a white solid (92%).

(6-Benzyloxynaphthalen-2-ylmethyl)-triphenyl-phosphonium Bromide (19)

The solution of 2-benzyloxy-6-bromomethyl-naphthalen (18) (1 equi.), and triphenylphosphine (1.1 equi.) in DMF (0.6 mL/mmole was stirred at 95 C for 15 h, cooled to room temperature, and quenched with ethyl acetate. The resulting white solid of (6-benzyloxynaphthalen-2-ylmethyl)-triphenylphosphonium bromide (19) was filtered and washed with ethyl acetate. Yield 98%.

(4-Pentyl-cyclohexyl)-methanol (21)

To a slurry of lithium aluminum hydride (2 equi.) in diethyl ether (4 mL/mmole), a solution of commercially available 4-pentylcyclohexanecarboxylic acid (20) (1 equi.) in diethyl ether (3 ml/mmole) was added at ice temperature over a period of 20 min. The reaction mixture was stirred at room temperature for 24 h, cooled to ice temperature, quenched slowly with water (1 mL/g LAH), 15% aqueous sodium hydroxide (1 mL/g LAH), and water (3 mL/g LAH) consecutively. MgSO4 (5 g/100 mL reaction solution) was added to the reaction mixture, stirred for 30 min, filtered through celite, and concentrated in vacuo to give (4-pentyl-cyclohexyl)-methanol (21) a colorless oil (95%).

4-Pentyl-cyclohexanecarboxaldehyde (22)

To a slurry of (4-pentyl-cyclohexyl)-methanol (21) (1 equi.), benzyltriethylammonium chloride (0.05 equi.), potassium carbonate (0.15 equi.), and sodium periodate (1.5 equi.) in chloroform-water (1:1) (2 mL/mmole), ruthenium chloride (0.03 equi.) was added at room temperature. The reaction mixture was stirred at 60 C for 2 h. 2-Propanol (0.3 equi.) was added and the reaction mixture was stirred for another 30 min at 60 C, cooled to room temperature, filtered through celite, extracted with dichloromethane, dried over MgSO4, and concentrated in vacuo. Purification by chromatography on silica gel (dichloromethane) afforded 4-pentyl-cyclohexanecarboxaldehyde (22) as a colorless oil (83%).

2-Benzyloxy-6-[2-(4-pentyl-cyclohexyl)-vinyl-naphthalene (23)

The solution of (6-benzyloxy-naphthalen-2-ylmethyl)-triphenyl-phosphonium bromide (19) (1 equi.), 4-pentyl-cyclohexanecarboxaldehyde (22), and potassium tert-butoxide (1.3 equi.) in tert-butyl methyl ether (6 mL/mmole) was stirred at room temperature for 24 h, then quenched with water, extracted with diethyl ether, washed with brine, dried over MgSO4, and concentrated in vacuo. Purification by chromatography on silica gel (1.25% EtOAc/hexane) afforded 2-benzyloxy-6-[2-(4-pentyl-cyclohexyl)-vinyl]-naphthalene (23) as a white solid (74%).

6-[2-(4-Pentyl-cyclohexyl)-ethyl-naphthalen-2-ol (24)

The solution of 2-benzyloxy-6-[2-(4-pentyl-cyclohexyl)-vinyl]-naphthalene (23) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove catalyst, concentrated in vacuo and recrystallized from acetonitrile-ethanol (3:1) to give pure 6-[2-(4-pentyl-cyclohexyl)-ethyl-naphthalen-2-ol (24) as a brown solid (88%).

4-Bromo-2-fluoro-1-(5,5,6,6,7,7,8,8,8-nonafluoro-octyloxy)-benzene (26)

To a solution of commercially available 4-bromo-2-fluorophenol (25) (1 equi.) and 4-(5,5,6,6,7,7,8,8,8-nonafluoro-octyloxy)-tosylate (10) (1 equi.) in DMF (3 mL/mmole), cesium carbonate (1.25 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) and recrystallization from acetonitrile afforded 4-bromo-2-fluoro-1-(5,5,6,6,7,7,8,8,8-nonafluoro-octyloxy)-benzene (26) a colorless oil (87%).

3-Fluoro-4-(5,5,6,6,7,7,8,8,8-nonafluoro-octyloxy)-benzoic Acid (27)

To a solution of 4-bromo-2-fluoro-1-(5,5,6,6,7,7,8,8,8-nonafluoro-octyloxy)-benzene (26) (1 equi.) in THF (5 mL/mmole) butyllithium (1.3 equi.) was added at −78 C. The reaction mixture was stirred at that temperature for 2 h, quenched with solid CO2, extracted with ethyl acetate, and washed with 10% aqueous sodium hydroxide. The sodium hydroxide solution acidified with 10% hydrochloric acid, extracted with ethyl acetate, washed with brine, dried over MgSO4, and concentrated in vacuo to give 3-fluoro-4-(5,5,6,6,7,7,8,8,8-nonafluoro-octyloxy)-benzoic acid (27) as a white solid (55%).

3-Fluoro-4-(5,5,6,6,7,7,8,8,8-nonafluoro-octyloxy)-benzoic Acid 6-[2-(4-Pentyl-cyclohexyl)-ethyl-naphthalen-2-yl Ester (28)

To a solution of 3-fluoro-4-(5,5,6,6,7,7,8,8,8-nonafluoro-octyloxy)-benzoic acid (27) (1 equi.), 6-[2-(4-pentyl-cyclohexyl)-ethyl-naphthalen-2-ol (24) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) and recrystallization from hexane gave 3-fluoro-4-(5,5,6,6,7,7,8,8,8-nonafluoro-octyloxy)-benzoic acid 6-[2-(4-pentyl-cyclohexyl)-ethyl-naphthalen-2-yl ester (28) a white solid (61%).

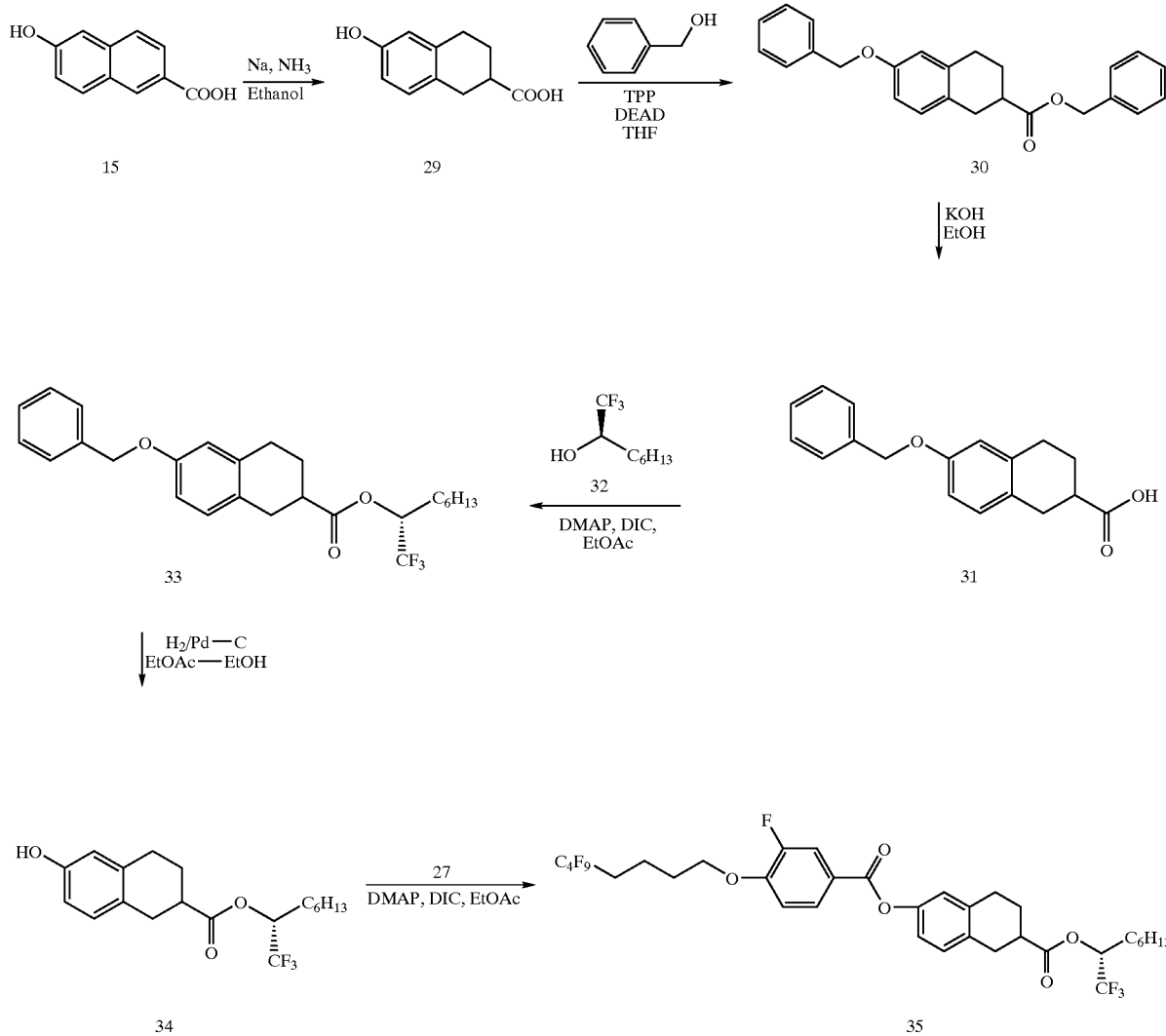

Scheme-3: Synthesis of 6-[3-Fluoro-4-(,4,5,5,6,6,7, 7,8,8,8-nonafluoro-octyloxy)-benzyloxy-1,2,3,4-tetrahydro-naphthalene-2-carboxylic Acid (1R)-1-Trifluoromethylheptyl Ester (MDW-1495)

6-Hydroxy-1,2,3,4-tetrahydro-naphthalene-2-carboxylic Acid (29)

Liquid ammonia (7 equi.) is condensed into a solution of 6-hydroxy-naphthalene-2-carboxylic acid (15) (1 equi) in ethanol (1.2 mL/mmole) at −78 C. Sodium (4.3 equi.) was added in 4 portions to the reaction mixture. Each portion gave blue color, but it disappeared quickly. The reaction mixture was stirred for 20 min, ammonium chloride (4.3 equi.) was added, it was stirred for another 1 h and anmmonia was distilled off by warming reaction pot to room temperature. The reaction mixture was quenched with water and 10% hydrochloric acid, extracted with ethyl acetate, washed with brine, dried over MgSO4, and concentrated in vacuo. Purification by recrystallization from acetonitrile gave 6-hydroxy-1,2,3,4-tetrahydro-naphthalene-2-carboxylic acid (29) as a white solid (73%).

6-Benzyloxy-1,2,3,4-tetrahydro-naphthalene-2-carboxylic Acid Benzyl Ester (30)

To a solution of 6-hydroxy-1,2,3,4-tetrahydro-naphthalene-2-carboxylic acid (29) (1 equi.), benzyl alcohol (2.2 equi.), and TPP (triphenylphoshine) (2.5 equi.) in THF (5 mL/mmole), DEAD (diethyl azodicarboxylate) (2.5 equi.) was added dropwise in 5 min at room temperature. The reaction mixture was stirred at 60 C for 15 h, quenched with water, extracted with ethyl acetate:hexane(1:1), washed with brine, dried over MgSO4, and concentrated in vacuo. Purification by chromatography on silica gel (20% EtOAc/hexanes) and recrystallization from acetonitrile afforded 6-benzyloxy-1,2,3,4-tetrahydro-naphthalene-2-carboxylic acid benzyl ester (30) a white solid (68%).

6-Benzyloxy-1,2,3,4-tetrahydro-naphthalene-2-carboxylic Acid (31)

A solution of 6-benzyloxy-1,2,3,4-tetrahydro-naphthalene-2-carboxylic acid benzyl ester (30) (1 equi.) and potassium hydroxide (3.5 equi.) in water-ethanol (1:1) (25 mL/mmole) was stirred at 80 C temperature for 2 h, cooled to room temperature, and quenched with hydrochloric acid (5%), the resulting white solid was filtered, washed with water, and dried under vacuum to give 6-benzyloxy-1,2,3,4-tetrahydro-naphthalene-2-carboxylic acid (31) as a white solid (95%).

6-Benzyloxy-1,2,3,4-tetrahydro-naphthalene-2-carboxylic Acid (1R)-1-Trifluoromethylheptyl Ester (33)

To a solution of 6-benzyloxy-1,2,3,4-tetrahydro-naphthalene-2-carboxylic acid (31) (1 equi.), (R)-1-trifluoromethylheptyl-1-ol (32) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) gave 6-benzyloxy-1,2,3,4-tetrahydro-naphthalene-2-carboxylic acid (1R)-1-trifluoromethylheptyl ester (33) as a colorless oil (67%).

6-Hydroxy-1,2,3,4-tetrahydro-naphthalene-2-carboxylic Acid (1R)-1-Trifluoromethylheptyl Ester (34)

A solution of 6-benzyloxy-1,2,3,4-tetrahydro-naphthalene-2-carboxylic acid (1R)-1-trifluoromethylheptyl ester (33) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove Pd-C catalyst, concentrated in vacuo.and recrystallized from acetonitrile-ethanol (3:1) to give pure 6-hydroxy-1,2,3,4-tetrahydro-naphthalene-2-carboxylic acid (1R)-1-trifluoromethylheptyl ester (34) as a colorless oil (86%).

6-[3-Fluoro-4-(,4,5,5,6,6,7,7,8,8,8-nonafluoro-octyloxy)-benzyloxy-1,2,3,4-tetrahydro-naphthalene-2-carboxylic Acid (1R)-1-Trifluoromethylheptyl Ester (35)

To the solution of 6-hydroxy-1,2,3,4-tetrahydro-naphthalene-2-carboxylic acid (1R)-1-trifluoromethylheptyl ester (34) (1 equi.), 3-fluoro-4-(5,5,6,6,7,7,8,8,8-nonafluoro-octyloxy)-benzoic acid (27) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) and recrystallization from hexane gave 6-[3-fluoro-4-(,4,5,5,6,6,7,7,8,8,8-nonafluoro-octyloxy)-benzyloxy-1,2,3,4-tetrahydro-naphthalene-2-carboxylic acid (1R)-1-trifluoromethylheptyl ester (35) a white solid (48%).

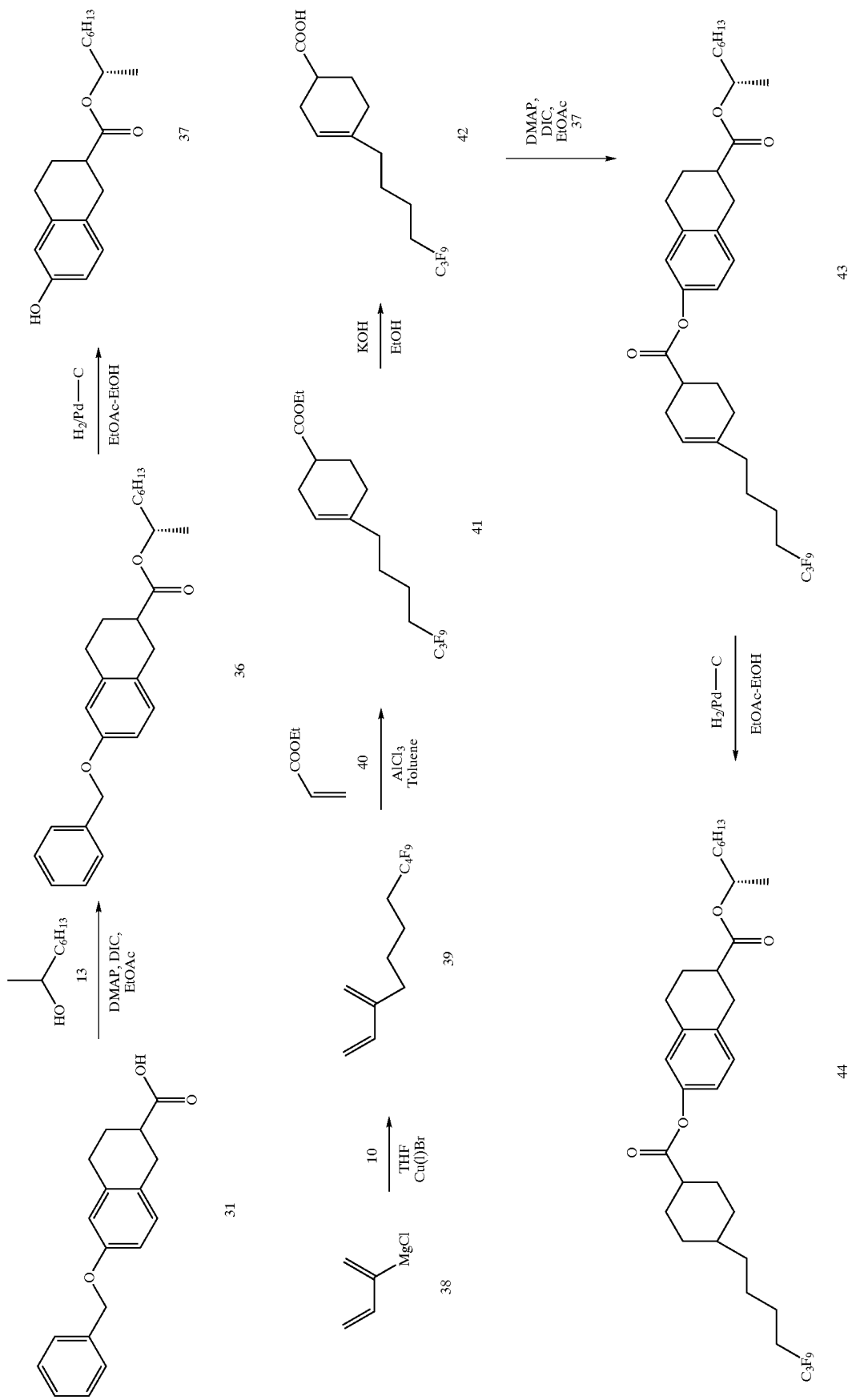

Scheme-4: 6-[4-(5,5,6,6,7,7,8,8,8-Nonafluoro-octyl)-cyclohexanecarbonyloxyl]-1,2,3,4-tetrahydro-naphthalene-2-carboxylic Acid (1S)-1-Methylheptyl Ester (44) (MDW-1550)

6-Benzyloxy-1,2,3,4-tetrahydro-naphthalene-2-carboxylic Acid (1S)-1-Methylheptyl Ester (36)

To a solution of 6-benzyloxy-1,2,3,4-tetrahydro-naphthalene-2-carboxylic acid (31) (1 equi.), (R)-1-methylheptyl-1-ol (13) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (3% EtOAc/hexanes) gave 6-benzyloxy-1,2,3,4-tetrahydro-naphthalene-2-carboxylic acid (1S)-1-methylheptyl ester (36) as a colorless oil (53%).

6-Hydroxy-1,2,3,4-tetrahydro-naphthalene-2-carboxylic Acid (1S)-1-Methylheptyl Ester (37)

A solution of 6-benzyloxy-1,2,3,4-tetrahydro-naphthalene-2-carboxylic acid (1S)-1-trifluoromethylheptyl ester (36) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove Pd-C catalyst, concentrated in vacuo, and recrystallized from acetonitrile-ethanol (3:1) to give pure 6-hydroxy-1,2,3,4-tetrahydro-naphthalene-2-carboxylic acid (1S)-1-methylheptyl ester (37) as a colorless oil (98%).

2-(5,5,6,6,7,7,8,8,8-Nonafluoro-octyl)-buta-1,3-diene (39)

To a solution of 4-(5,5,6,6,7,7,8,8,8-nonafluoro-octyl)-tosylate (10), (1 equi) and copper (I) bromide (0.05 equi.) in THF (2 mL/mmole), a solution of buta-1,3-diene-2-magnesium chloride, prepared as described in (3), (38) (0.5M in THF) (1.3 equi.) was added at ice temperature over a period of 20 min. The reaction mixture was stirred at room temperature for 24 h, quenched with 5% aqueous ammonium chloride (1 mL/mmole), extracted with hexane, washed with brine, dried over MgSO4, and concentrated in vacuo. Purification by chromatography on silica gel (hexane) gave 2-(5,5,6,6,7,7,8,8,8-nona fluoro-octyl)-buta-1,3-diene (39) a colorless oil (96%).

4-(5,5,6,6,7,7,8,8,8-Nonafluoro-octyl)-cyclohex-3-enecarboxylic Acid Ethyl Ester (41)

To a slurry of aluminum chloride (0.1 equi) in toluene (1 mL/mmole), ethyl acrylate (1 equi.) (1 equi.) was added at ice temperature. The reaction mixture was stirred at ice temperature for 10 min. Then a solution 2-(5,5,6,6,7,7,8,8,8-nonafluoro-octyl)-buta-1,3-diene (40) (0.5M in THF) (1 equi.) was added at ice temperature over a period of 20 min. The reaction mixture was stirred at ice temperature for 10 h, water, extracted with hexane, washed with brine, dried over MgSO4, and concentrated in vacuo. Purification by chromatography on silica gel (hexanes) gave 4-(5,5,6,6,7,7,8,8,8-nonafluoro-octyl)-cyclohex-3-enecarboxylic acid ethyl ester (41) as a colorless oil (88%).

4-(5,5,6,6,7,7,8,8,8-Nonafluoro-octyl)-cyclohex-3-enecarboxylic Acid (44)

A solution 4-(5,5,6,6,7,7,8,8,8-nonafluoro-octyl)-cyclohex-3-enecarboxylic acid ethyl ester (41) (1 equi.) and potassium hydroxide (3.5 equi.) in water-ethanol (1:1) (25 mL/mmole) was stirred at 80 C temperature for 2 h., cooled to room temperature and quenched with hydrochloric acid (5%), filtered resulted white solid, washed with water and dried under vacuum to give 4-(5,5,6,6,7,7,8,8,8-nonafluoro-octyl)-cyclohex-3-enecarboxylic acid (42) as a white solid (93%).

6-[4-(5,5,6,6,7,7,8,8,8-Nonafluoro-octyl)-cyclohex-3-enecarbonyloxyl]-1,2,3,4-tetrahydro-naphthalene-2-carboxylic Acid (1S)-1-Methylheptyl Ester (43)

To a solution give 4-(5,5,6,6,7,7,8,8,8-nonafluoro-octyl)-cyclohex-3-enecarboxylic acid (42) (1 equi.), 6-hydroxy-1,2,3,4-tetrahydro-naphthalene-2-carboxylic acid (1S)-1-methylheptyl ester (37) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) gave 6-[4-(5,5,6,6,7,7,8,8,8-nonafluoro-octyl)-cyclohex-3-enecarbonyloxyl]-1,2,3,4-tetrahydro-naphthalene-2-carboxylic acid (1S)-1-methylheptyl ester (43 as a white solid (81%).

6-[4-(5,5,6,6,7,7,8,8,8-Nonafluoro-octyl)-cyclohexanecarbonyloxyl]-1,2,3,4-tetrahydro-naphthalene-2-carboxylic Acid (1S)-1-Methylheptyl Ester (44)

A solution of 6-[4-(5,5,6,6,7,7,8,8,8-nonafluoro-octyl)-cyclohex-3-enecarbonyloxyl]-1,2,3,4-tetrahydro-naphthalene-2-carboxylic acid-(1S)-1-methylheptyl ester (43) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove Pd-C catalyst, concentrated in vacuo.and recrystallized from acetonitrile-ethanol (3:1) to give 6-[4-(5,5,6,6,7,7,8,8,8-nonafluoro-octyl)-cyclohexanecarbonyloxyl]-1,2,3,4-tetrahydro-naphthalene-2-carboxylic acid-(1S)-1-methylheptyl ester (44) a white solid (89%).

Preparation of MDW-1545:

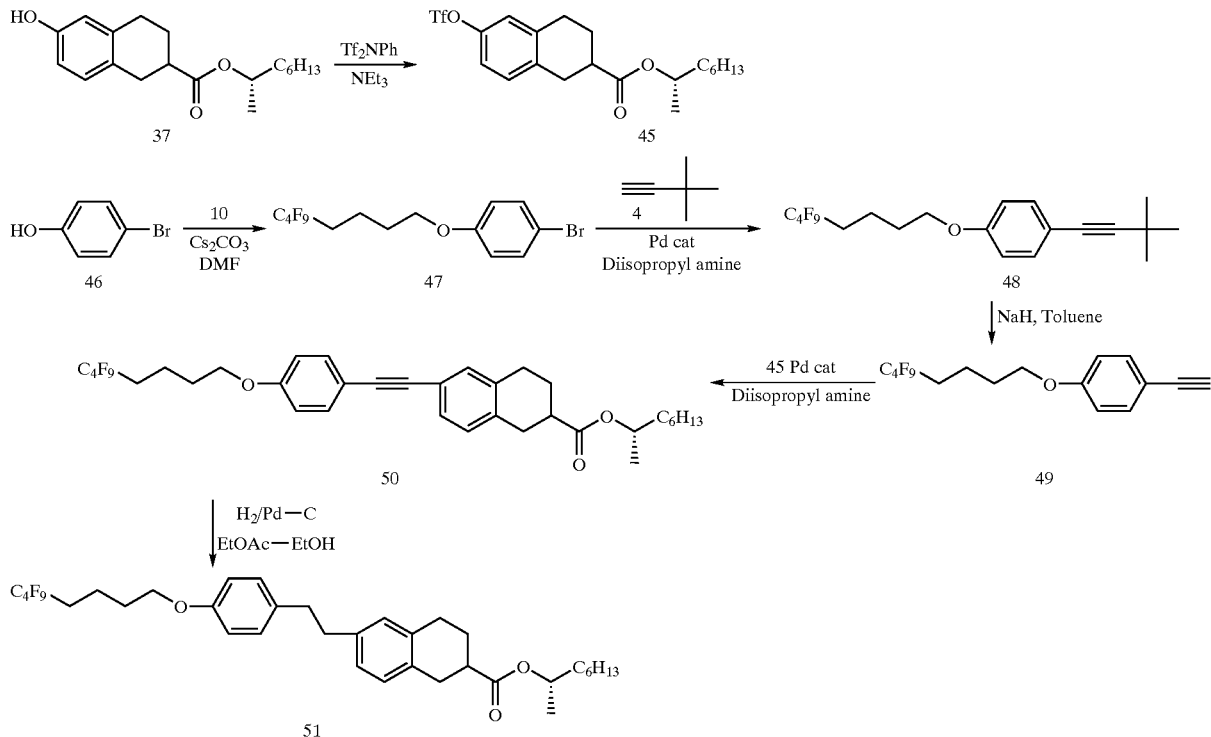

Scheme-5: 6-{2-4-(5,5,6,6,7,7,8,8,8-nonafluoro-octyloxy)-phenyl]-ethyl}-1,2,3,4-tetrahydro-naphthalene-2-carboxylic Acid-(1S)-1-Methylheptyl Ester (51) (MDW 1545)

6-Trifluoromethanesulfonyloxy-1,2,3,4-tetrahydro-naphthalene-2-carboxylic Acid (1S)-1-Methylheptyl Ester (45)

To a solution 6-hydroxy-1,2,3,4-tetrahydro-naphthalene-2-carboxylic acid (1S)-1-methylheptyl ester (37) (1 equi.), and N-phenyl trifluoromethanesulfonamide (1 equi.) in dichloromethane (10 mL/mmole), triethylamine (1.5 equi.) was added at −78 C. The reaction mixture was stirred at that temperature for 1 h and at room temperature for 24 h, quenched with water, extracted with ethyl acetate:hexane (1:1), washed with brine, dried over MgSO4, and concentrated in vacuo. Purification by chromatography on silica gel (5% EtOAc/hexanes) gave 6-trifluoromethanesulfonyloxy-1,2,3,4-tetrahydro-naphthalene-2-carboxylic acid (1S)-1-methylheptyl ester (45), as a colorless oil (92%).

1-Bromo-4-(5,5,6,6,7,7,8,8,8-nonafluoro-octyloxy)-benzene (47)

To a solution of commercially available 4-bromophenol (46) (1 equi.) and 4-(5,5,6,6,7,7,8,8,8-nonafluoro-octyloxy)-osylate (10) (1 equi.) in DMF (3 mL/mmole), cesium carbonate (1.25 equi.) was added at room temperature. The reaction mixture was stirred at that temperature for 24 h, quenched with water, extracted with ethyl acetate:hexane (1:1), washed with brine, dried over MgSO4, and concentrated in vacuo. Purification by chromatography on silica gel (5% EtOAc/hexanes) eafforded 1-bromo-4-(5,5,6,6,7,7,8,8,8-nonafluoro-octyloxy)-benzene (47) a colorless oil (65%).

1-(3,3-Dimethyl-butyl-1-ynyl)-4-(5,5,6,6,7,7,8,8,8-nonafluoro-octyloxy)-benzene (48)

Nitrogen gas was bubbled through the solution of 1-bromo-4-(5,5,6,6,7,7,8,8,8-nonafluoro-octyloxy)-benzene (47) (1 equi.) and 2-methyl-3-butyn-2-ol (4) (1.2 equi.) in diisopropyl amine (15 mL/mmole) for 15 min. Pd catalyst (0.01 equi.) was added to the reaction mixture and continued nitrogen bubbling for another 15 min. The reaction mixture was stirred at 80 C for 15 h, cooled to room temperature, quenched with water, extracted with ethyl acetate:hexane (1:1), washed with brine, dried over MgSO4, and concentrated in vacuo. Purification by chromatography on silica gel (50% EtOAc/hexanes) and recrystallization from hexane afforded 1-(3,3-dimethyl-butyl-1-ynyl)-4-(5,5,6,6,7,7,8,8,8-nonafluoro-octyloxy)-benzene (48) as a colorless oil (83%).

1-Ethynyl)-4-(5,5,6,6,7,7,8,8,8-nonafluoro-octyloxy)-benzene (49)

Sodium hydride (0.2 equi.) was added to the solution 1-(3,3-dimethyl-butyl-1-ynyl)-4-(5,5,6,6,7,7,8,8,8-Úonafluoro-octyloxy)-benzene (48) (1 equi.) toluene (10 mL/mmole) and the reaction mixture was stirred at 120 C for 1 h while half of the toluene from the reaction mixture distilled off. The reaction mixture was cooled to room temperature, passed through 2" silica gel plug, concentrated in vacuo to give pure solution 1-ethynyl)-4-(5,5,6,6,7,7,8,8,8-nonafluoro-octyloxy)-benzene (49) as a yellow oil (89%).

6-[4-(5,5,6,6,7,7,8,8,8-Nonafluoro-octyloxy)-phenylethynyl]-1,2,3,4-tetrahydro-naphthalene-2-carboxylic Acid (1S)-1-Methylheptyl Ester (50)

Nitrogen gas was bubbled through the solution of 1-ethynyl)-4-(5,5,6,6,7,7,8,8,8-nonafluoro-octyloxy)-benzene (49) (1 equi.) and 6-trifluoromethanesulfonyloxy- 1,2,3,4-tetrahydro-naphthalene-2-carboxylic acid-(1S)-1-methylheptyl ester (45) (1 equi.) in diisopropyl amine (15 mL/mmole) for 15 min. Pd catalyst(0.01 equi.) was added to the reaction mixture and continued nitrogen bubbling for another 15 min. The reaction mixture was stirred at 80 C for 15 h and cooled to room temperature. A white solid separated. The white solid was further purified by chromatography on silica gel (5% ethyl acetate-hexane) and recrystallization from acetonitrile to give 6-[4-(5,5,6,6,7,7,8,8,8-nonafluoro-octyloxy)-phenylethynyl]-1,2,3,4-tetrahydro-naphthalene-2-carboxylic acid-(1S)-1-methylheptyl ester (50) as a white solid (42%).

6-{2-4-(5,5,6,6,7,7,8,8,8-nonafluoro-octyloxy)-phenyl]-ethyl}-1,2,3,4-tetrahydro-naphthalene-2-carboxylic Acid (1S)-1-Methylheptyl Ester (51)

The solution of give 6-[4-(5,5,6,6,7,7,8,8,8-nonafluoro-octyloxy)-phenylethynyl]-1,2,3,4-tetrahydro-naphthalene-2-carboxylic acid-(1S)-1-methylheptyl ester (50) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove Pd-C catalyst, concentrated in vacuo.and recrystallized from acetonitrile-ethanol (3:1) to give pure 6-{2-4-(5,5,6,6,7,7,8,8,8-nonafluoro-octyloxy)-phenyl]-ethyl}-1,2,3,4-tetrahydro-naphthalene-2-carboxylic acid (1S)-1-methylheptyl ester (51) as a white solid (93%).

Scheme-6: 6-[2,3-Difluoro-4-(5,5,6,6,7,7,8,8,8-nonafluoro-octyloxy)-benzyloxy-naphthalene-2-carboxylic Acid (1R)-1-Trifluoromethylheptyl Ester (59) (MDW-1414)

6-Benzyloxy-naphthalene-2-carboxylic Acid Benzyl Ester (55)

To a solution of 6-hydroxy-naphthalene-2-carboxylic acid (15) (1 equi.), benzyl alcohol (2.2 equi.), and TPP (triphenylphoshine) (2.5 equi.) in THF (5 mL/mmole), DEAD (diethyl azodicarboxylate) (2.5 equi.) was added dropwise in 5 min at room temperature. The reaction mixture was stirred at 60 C for 15 h, quenched with water, extracted with ethyl acetate:hexane(1:1), washed with brine, dried over MgSO4, and concentrated in vacuo. Purification by chromatography on silica gel (20% EtOAc/hexanes) and recrystallization from acetonitrile afforded 6-benzyloxy-naphthalene-2-carboxylic acid benzyl ester (52) a white solid (82%).

6-Benzyloxy-naphthalene-2-carboxylic Acid (53)

A solution of 6-benzyloxy -naphthalene-2-carboxylic acid benzyl ester (52) (1 equi.) and potassium hydroxide (3.5 equi.) in water-ethanol (1:1) (25 mL/mmole) was stirred at 80 C temperature for 2 h., cooled to room temperature and quenched with hydrochloric acid (5%), filtered resulted white solid, washed with water, and dried under vacuum to 6-benzyloxy-naphthalene-2-carboxylic acid (53) as a white solid (81%).

6-Benzyloxy-naphthalene-2-carboxylic Acid (1R)-1-Trifluoromethylheptyl Ester (54)

To a solution to 6-benzyloxy-naphthalene-2-carboxylic acid (53) (1 equi.), (R)-1-trifluoromethylheptyl-1-ol (32) (1

Preparation of MDW-1414:

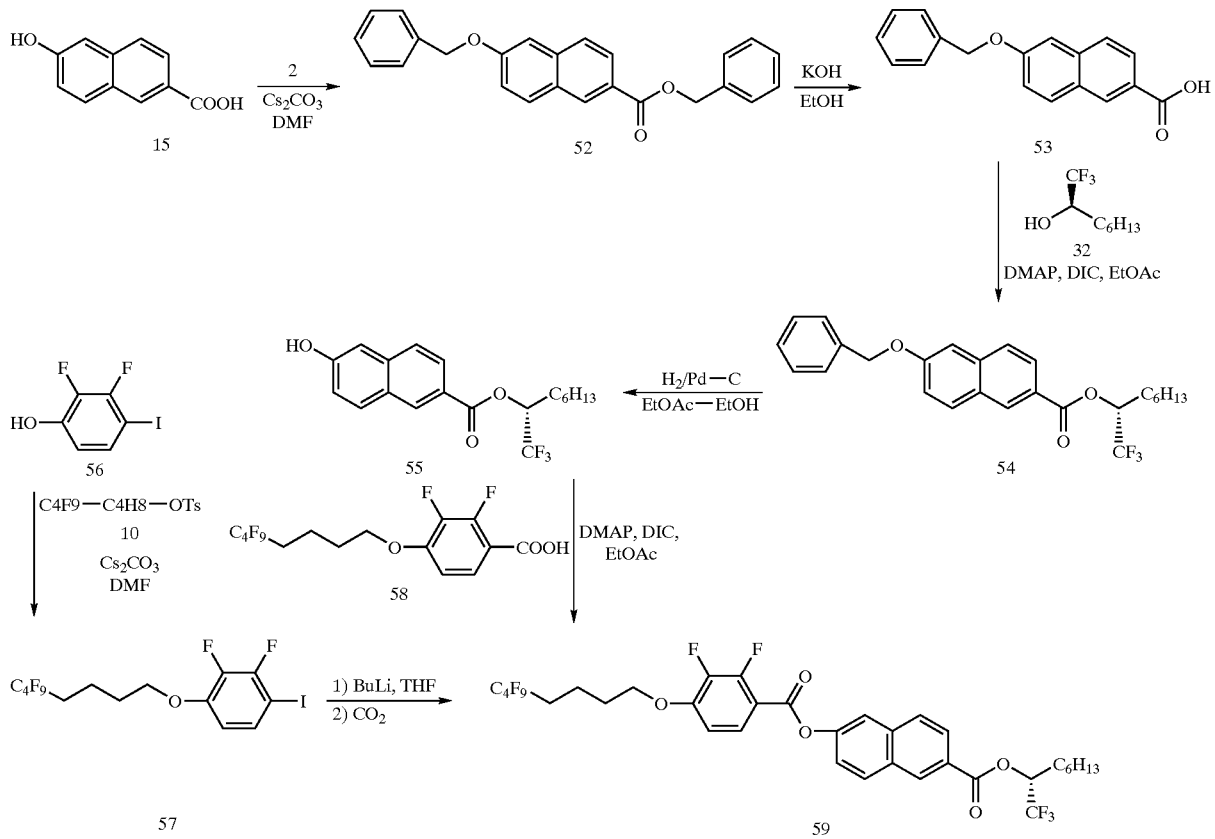

equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) gave 6-benzyloxy-naphthalene-2-carboxylic acid (1R)-1-trifluoromethylheptyl ester (54) as a colorless oil (72%).

6-Hydroxy-naphthalene-2-carboxylic Acid (1R)-1-Trifluoromethylheptyl Ester (55)

The solution gave 6-benzyloxy-naphthalene-2-carboxylic acid (1R)-1-trifluoromethylheptyl ester (54) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove Pd-C catalyst, concentrated in vacuo, and recrystallized from acetonitrile-ethanol (3:1) to give pure 6-hydroxy-naphthalene-2-carboxylic acid (1R)-1-trifluoromethylheptyl ester (55) as a colorless oil (95%).

2,3-Difluoro-1-iodo-4-(5,5,6,6,7,7,8,8,8-nonafluoro-octyloxy)-benzene (57)

To a solution of 2,3-difluoro-4-iodo-phenol (56) (1 equi.) and 4-(5,5,6,6,7,7,8,8,8-nonafluoro-octyloxy)-tosylate-(10) (1 equi.) in DMF (3 mL/mmole), cesium carbonate (1.25 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) and recrystallization from acetonitrile gave 2,3-difluoro-1-iodo-4-(5,5,6,6,7,7,8,8,8-nonafluoro-octyloxy)-benzene (57) as a colorless oil (98%).

2,3-Difluoro-1-iodo-4-(5,5,6,6,7,7,8,8,8-nonafluoro-octyloxy)-benzoic Acid (58)

To a solution of difluoro-1-iodo-4-(5,5,6,6,7,7,8,8,8-nonafluoro-octyloxy)-benzene (57) (1 equi.) in THF (5 mL/mmole) butyllithium (1.3 equi.) was added at −78 C. The reaction mixture was stirred at that temperature for 2 h, quenched with solid CO2, extracted with ethyl acetate, and washed with sodium hydroxide. The sodium hydroxide solution was a cidified with 10% hydrochloric acid, extracted with ethyl acetate, washed with brine, dried over MgSO4, and concentrated in vacuo to give 2,3-difluoro-1-iodo-4-(5,5,6,6,7,7,8,8,8-nonafluoro-octyloxy)-benzoic acid (58) as a brown solid (54%).

6-[2,3-Difluoro-4-(5,5,6,6,7,7,8,8,8-nonafluoro-octyloxy)-benzyloxy-naphthalene-2-carboxylic Acid (1R)-1-Trifluoromethylheptyl Ester (59)

To a solution of 6-hydroxy-naphthalene-2-carboxylic acid (1R)-1-trifluoromethylheptyl ester (55) (1 equi.) and 2,3-difluoro-1-iodo-4-(5,5,6,6,7,7,8,8,8-nonafluoro-octyloxy)-benzoic acid (58) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:(hexane(1:1), washed with brine, dried over MgSO4, and concentrated in vacuo. Purification by chromatography on silica gel (5% EtOAc/hexanes) and recrystallization from hexane gave 6-[2,3-difluoro-4-(5,5,6,6,7,7,8,8,8-nonafluoro-octyloxy)-benzyloxy-naphthalene-2-carboxylic acid (1R)-1-trifluoromethylheptyl ester (59) as a white solid (29%).

Preparation of MDW-1228 and 1248:

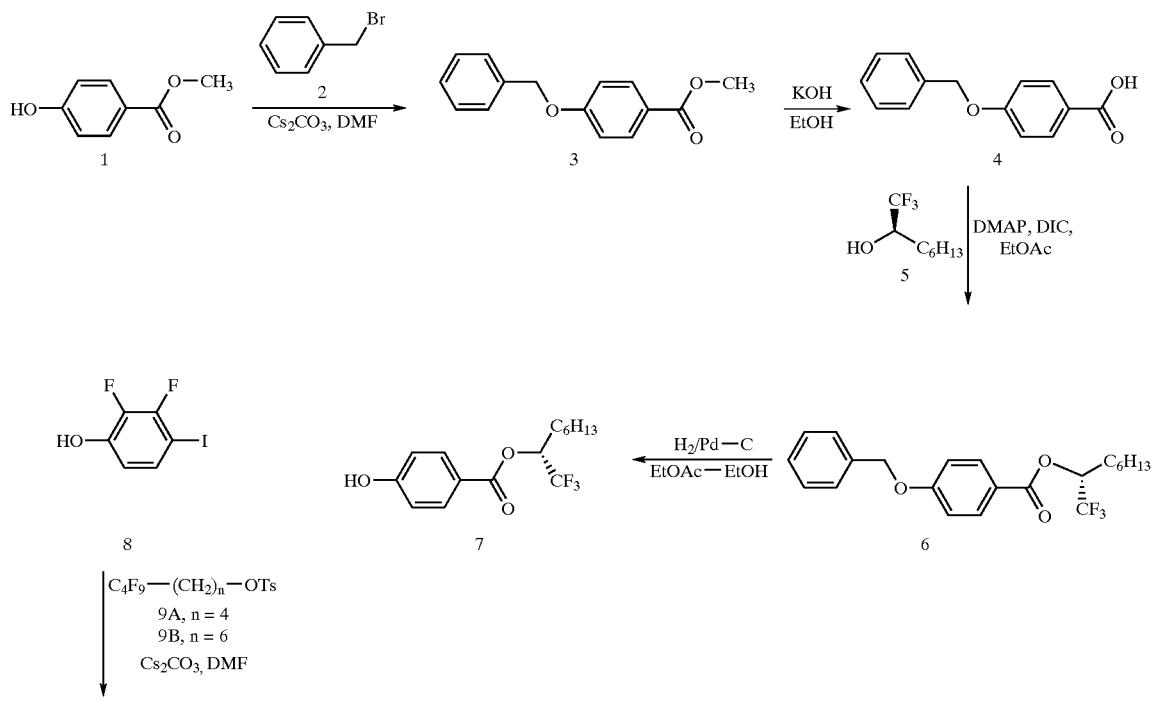

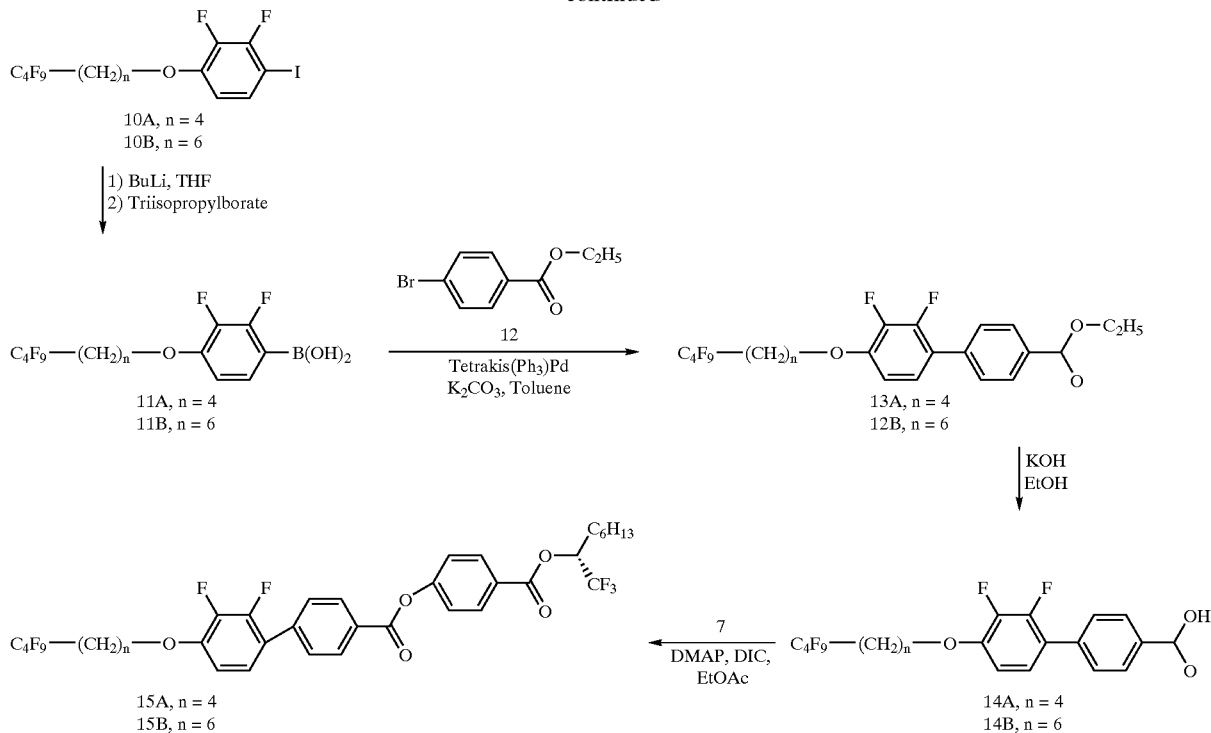

4-Benzyloxy-benzoic Acid Methyl Ester (3)

To a commercially available 4-hydroxy-benzoic acid methyl ester (1) (1 equi.) and benzyl bromide (2) (1 equi.) in DMF (3 mL/mmole), cesium carbonate (1.25 equi.) was added at room temperature. The reaction mixture was stirred at that temperature for 24 h, quenched with water, extracted with ethyl acetate:hexane (1:1), washed with brine, dried over MgSO4, and concentrated in vacuo. Purification by chromatography on silica gel (5% EtOAc/hexanes) and recrystallization from acetonitrile afforded 4-benzyloxy-benzoic acid methyl ester (3), a white solid (88%).

4-Benzyloxy-benzoic Acid (4)

A solution 4-benzyloxy-benzoic acid methyl ester (3) (1 equi.) and potassium hydroxide (3.5 equi.) in water-ethanol (1:1) (25 mL/mmole) was stirred at 80 C temperature for 2 h., cooled to room temperature, quenched with hydrochloric acid (5%). The resulting white solid was filtered, washed with water, and dried under vacuum to give 4-benzyloxy-benzoic acid (4)) as a white solid (80%).

4-Benzyloxy-benzoic Acid (R)-1-Trifluoromethyl-heptyl Ester (6)

To a solution of 4-benzyloxy-benzoic acid (4) (1 equi.), (R)-1-trifluoromethylheptyl-1-ol (5) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane (1:1), washed with brine, dried over MgSO4, and concentrated in vacuo. Purification by chromatography on silica gel (5% EtOAc/hexanes) gave 4-benzyloxy-benzoic acid (R)-1-trifluoromethyl-heptyl ester (6) as a colorless oil (65%).

4-Hydroxy Benzoic Acid (R)-1-Trifluoromethyl-heptyl Ester (7)

A solution of 4-benzyloxy-benzoic acid (R)-1-trifluoromethyl-heptyl ester (6) (1 equi.) and palladium-carbon (10%) (0.01 equi.) in ethyl acetate-ethanol (4:1) (25 mL/mmole) was degassed under vacuum and the reaction mixture was stirred at room temperature under constant flow of hydrogen gas for 14 h. The reaction mixture passed through 2" celite-silica gel plug to remove Pd-C catalyst, concentrated in vacuo and recrystallized from acetonitrile-ethanol (3:1) to give 4-hydroxy benzoic acid (R)-1-trifluoromethyl-heptyl ester (7) as a colorless oil (84%).

2,3-Difluoro-1-iodo-4-(5,5,6,6,7,7,8,8,8-nonafluoro-octyloxy)-benzene (10A)

To a solution of 2,3-difluoro-4-iodo-phenol (8), prepared as described in [Edger 1990], (1 equi.) and 4-(5,5,6,6,7,7,8,8-nonafluoro-octyloxy)-tosylate (9A), prepared as described in [Sakaigawa], (1 equi.) in DMF (3 mL/mmole), cesium carbonate (1.25 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (10% EtOAc/hexanes) afforded 2,3-difluoro-1-iodo-4-(5,5,6,6,7,7,8,8,8-nonafluoro-octyloxy)-benzene (10A) a colorless oil (89%).

2,3-Difluoro-1-iodo-4-(7,7,8,8,9,9,10,10,10-nonafluoro-decyloxy)-benzene (10B)

2,3-Difluoro-1-iodo-4-(7,7,8,8,9,9,10,10,10-nonafluoro-decyloxy)-benzene (10B) was prepared from 4-(7,7,8,8,9,9,10,10,10-nonafluoro-decyloxy)-tosylate (9B), prepared as described in [Sakaigawa], as described in the preparation of 2,3-difluoro-1-iodo-4-(5,5,6,6,7,7,8,8,8-nonafluoro-octyloxy)-benzene (10A) yielding 2,3-difluoro-1-iodo-4-(7,7,8,8,9,9,10,10,10-nonafluoro-decyloxy)-benzene (10B) as a colorless oil (89%).

2,3-Difluoro-4-(5,5,6,6,7,7,8,8,8-nonafluoro-octyloxy)-phenylboronic Acid (11A)

To a solution 2,3-difluoro-1-iodo-4-(5,5,6,6,7,7,8,8,8-nonafluoro-octyloxy)-benzene (10A) (1 equi.) in THF (5 mL/mmole), butyllithium (1.3 equi.) was added at −78 C. The reaction mixture was stirred at that temperature for 2 hr,.

Then triisopropylborate (1 equi.) was added at that temperature. The reaction mixture was stirred at that temperature for 1 h and at room temperature for 10 h, quenched with water, extracted with ethyl acetate washed with brine, dried over MgSO4, and concentrated in vacuo. Purification by recrystallization from hexane afforded 2,3-difluoro-4-(5,5,6,6,7,7,8,8,8-nonafluoro-octyloxy)-phenylboronic acid (11A), as a white solid (75%).

2,3-Difluoro-4-(7,7,8,8,9,9,10,10,10-nonafluoro-decyloxy)-phenylboronic Acid (11B)

2,3-Difluoro-4-(7,7,8,8,9,9,10,10,10-nonafluoro-decyloxy)-phenylboronic acid (11B) was prepared from 2,3-difluoro-1-iodo-4-(7,7,8,8,9,9,10,10,10-nonafluoro-decyloxy)-benzene (10B) as described in the preparation 2,3-difluoro-4-(5,5,6,6,7,7,8,8,8-nonafluoro-octyloxy)-phenylboronic acid (11A), yielding 2,3-difluoro-4-(7,7,8,8,9,9,10,10,10-nonafluoro-decyloxy)-phenylboronic acid (11B) as a colorless oil (89%).

2',3'-Difluoro-4'-(5,5,6,6,7,7,8,8,8-nonafluoro-octyloxy)-biphenyl-4-carboxylic Acid Ethyl Ester (13A)

A bipsasic solution of 2,3-difluoro-4-(5,5,6,6,7,7,8,8,8-nonafluoro-octyloxy)-phenylboronic acid (11A) (1 equi.), 4-bromo-benzoic acid-ethyl ester (12), (1 equi.), sodium carbonate (2.7 equi.), and tetrakis(triphenylphoshine) palladium catalyst (0.01 equi.) in water-toluene (1:1) (2 mL/mmole) was stirred at 100 C temperature for 12 h., cooled to room temperature, extracted with ethyl acetate:hexane(1:1), washed with brine, dried over MgSO4, and concentrated in vacuo. The purification by chromatography on silica gel (5% EtOAc/hexanes) and recrystallization from acetonitrile afforded 2',3'-difluoro-4'-(5,5,6,6,7,7,8,8,8-nonafluoro-octyloxy)-biphenyl-4-carboxylic acid ethyl ester (13A), as a white solid (88%).

2',3'-Difluoro-4'-(7,7,8,8,9,9,10,10,10-nonafluoro-decyloxy)-biphenyl-4-carboxylic Acid Ethyl Ester (13B)

2',3'-Difluoro-4'-(7,7,8,8,9,9,10,10,10-nonafluoro-decyloxy)-biphenyl-4-carboxylic acid ethyl ester (13B) was prepared from 2,3-difluoro-4-(7,7,8,8,9,9,10,10,10-nonafluoro-decyloxy)-phenylboronic acid (11B) as described in the preparation 2',3'-difluoro-4'-(5,5,6,6,7,7,8,8,8-nonafluoro-octyloxy)-biphenyl-4-carboxylic acid ethyl ester (13A) yielding 2',3'-difluoro-4'-(7,7,8,8,9,9,10,10,10-nonafluoro-decyloxy)-biphenyl-4-carboxylic acid ethyl ester (13B) as a white solid (88%).

2',3'-Difluoro-4'-(5,5,6,6,7,7,8,8,8-nonafluoro-octyloxy)-biphenyl-4-carboxylic Acid (14 A)

A solution of 2',3'-difluoro-4'-(5,5,6,6,7,7,8,8,8-nonafluoro-octyloxy)-biphenyl-4-carboxylic acid ethyl ester (13A) (1 equi.) and potassium hydroxide (3.5 equi.) in water-ethanol (1:1) (25 mL/mmole) was stirred at 80 C temperature for 2 h., cooled to room temperature, quenched with hydrochloric acid (5%). The resulting white solid was filtered, washed with water, and dried under vacuum to give 2',3'-difluoro-4'-(5,5,6,6,7,7,8,8,8-nonafluoro-octyloxy)-biphenyl-4-carboxylic acid (14 A) as a white solid (80%).

2',3'-Difluoro-4'-(7,7,8,8,9,9,10,10,10-nonafluoro-decyloxy)-biphenyl-4-carboxylic Acid (14B)

2',3'-Difluoro-4'-(7,7,8,8,9,9,10,10,10-nonafluoro-decyloxy)-biphenyl-4-carboxylic acid (14B) was prepared from 2',3'-difluoro-4'-(7,7,8,8,9,9,10,10,10-nonafluoro-decyloxy)-biphenyl-4-carboxylic acid ethyl ester (13B) as described in the preparation 2',3'-difluoro-4'-(5,5,6,6,7,7,8,8,8-nonafluoro-octyloxy)-biphenyl-4-carboxylic acid (14 A) yielding 2',3'-difluoro-4'-(7,7,8,8,9,9,10,10,10-nonafluoro-decyloxy)-biphenyl-4-carboxylic acid (14B) as a white solid (88%).

2',3'-Difluoro-4'-(5,5,6,6,7,7,8,8,8-nonafluoro-octyloxy)-biphenyl-4-carboxylic Acid 4-[(R)-1-Trifluoromethyl-heptyloxycarbonyl]-phenyl Ester (15A) (MDW 1228)

To a solution of 2',3'-difluoro-4'-(5,5,6,6,7,7,8,8,8-nonafluoro-octyloxy)-biphenyl-4-carboxylic acid (14 A) (1 equi.), (4-hydroxy benzoic acid (R)-1-trifluoromethyl-heptyl ester (7) (1 equi.), and DMAP (dimethylaminopyridine) (0.1 equi.) in THF (25 mL/mmole), DIC (diisopropyl carbodiimide) (1.2 equi.) was added at room temperature. The reaction mixture was stirred at that temperature for 24 h, quenched with water, extracted with ethyl acetate:hexane(1:1), washed with brine, dried over MgSO4, and concentrated in vacuo. Purification by chromatography on silica gel (5% EtOAc/hexanes) gave 2',3'-difluoro-4'-(5,5,6,6,7,7,8,8,8-nonafluoro-octyloxy)-biphenyl-4-carboxylic acid 4-[(R)-1-trifluoromethyl-heptyloxycarbonyl]-phenyl ester (15A) as a white solid (65%).

2',3'-Difluoro-4'-(7,7,8,8,9,9,10,10,10-nonafluoro-decyloxy)-biphenyl-4-carboxylic Acid 4-[(R)-1-Trifluoromethyl-heptyloxycarbonyl]-phenyl Ester (15B) (MDW 1248)

2',3'-Difluoro-4'-(7,7,8,8,9,9,10,10,10-nonafluoro-decyloxy)-biphenyl-4-carboxylic acid 4-[(R)-1-trifluoromethyl-heptyloxycarbonyl]-phenyl ester (15B) was prepared from 2',3'-difluoro-4'-(7,7,8,8,9,9,10,10,10-nonafluoro-decyloxy)-biphenyl-4-carboxylic acid (14B) as described in the preparation 2',3'-difluoro-4'-(5,5,6,6,7,7,8,8,8-nonafluoro-octyloxy)-biphenyl-4-carboxylic acid 4-[(R)-1-trifluoromethyl-heptyloxycarbonyl]-phenyl ester (15A) yielding 2',3'-difluoro-4'-(7,7,8,8,9,9,10,10,10-nonafluoro-decyloxy)-biphenyl-4-carboxylic acid 4-[(R)-1-trifluoromethyl-heptyloxycarbonyl]-phenyl ester (15B)) as a white solid (88%).

References (1) Dawson et al., Am. Chem. Soc. Sym., 346, ch.38
(2) Fleming F. F. and Jiang T., J. Org. Chem., 62, 7890 (1997)
(3) Sakaigawa A. and Nohira H., Ferroelectrics, 148, 71 (1993)
(4) Edger K. J. and Falling N., J. Org. Chem., 55, 5287 (1990)

Although the description above contains many specificities, these are not to be construed as limiting the scope of the invention, but rather, providing examples of some of the presently-preferred embodiments of the invention. Thus, the scope of the invention should be determined by the appended claims and their legal equivalents, rather than by the examples given. All references cited are hereby incorporated by reference to the extent not inconsistent with the disclosure herewith.

We claim:

1. A liquid crystal composition comprising a bistable host material and a compound of formula:

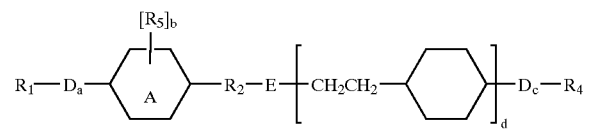

where R1 and R4 are selected from the group consisting of: straight chain alkyl chains and terminally or internally branched alkyl chains with from 3 to 12 carbons which are optionally partially fluorinated and may have one carbon replaced with —O—;

where A is a cyclohexyl ring, a cyclohexenyl ring or a phenyl ring;

D is either O or

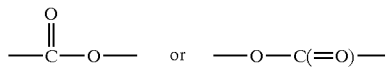

and the D's may be different;
a is 0 or 1;
b is 0, 1 or 2;
c is 0 or 1;
d is 0 or 1;
R5 is a fluorine atom;
R2 is a linker selected from the group consisting of: ethyl; butyl;

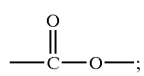

and —O—C(=O)—; and
and E is a 1,2,3,4-tetrahydronaphthalene ring.

2. The composition of claim 1, wherein the compound is present in the composition at between about 2 and 100% by weight.

3. The composition of claim 1, wherein the compound is present in the composition at between about 5% and 15% by weight.

4. The composition of claim 1, wherein the compound is present in the composition at between about 5% and 50% by weight.

5. The composition of claim 1, wherein one of R1 or R4 is $(CH_2)_n(CF_2)_mF$ where n is an integer from 1 to 6 and m is an integer from 1 to 6.

6. The composition of claim 1, wherein said bistable host material contains at least one naphthalene-containing compound.

7. The liquid crystal composition of claim 1, said composition having a switching angle greater than 15°.

8. The liquid crystal composition of claim 1, said composition having an A–C transition temperature greater than 50° C.

9. The liquid crystal composition of claim 1, said composition aligning in a device with a contrast ratio greater than 20:1.

10. A liquid crystal composition comprising a bistable host material and a compound of formula:

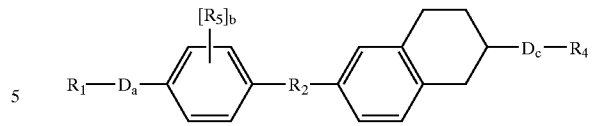

where R1 and R4 are selected from the group consisting of: straight chain alkyl chains and branched alkyl chains with from 3 to 12 carbons which are optionally partially fluorinated and may have one carbon replaced with —O—;
D is either O or

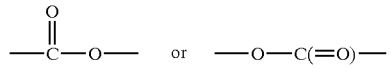

and the D's may be different;
a is 0 or 1;
b is 0, 1 or 2;
c is 0 or 1;
R5 is a fluorine atom;
R2 is a linker selected from the group consisting of ethyl; butyl;

and —O—C(=O)—.

11. A liquid crystal composition comprising a bistable host material and a compound of formula:

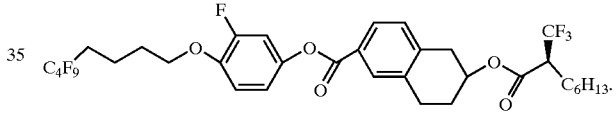

12. A bistable FLC device comprising the composition of claim 1.

13. A bistable FLC device consisting essentially of the composition of claim 1.

14. A bistable FLC device comprising the composition of claim 10.

15. A bistable FTC device consisting essentially of the composition of claim 10.

16. A bistable FLC device comprising the composition of claim 11.

17. A bistable FLC device consisting essentially of the composition of claim 11.

* * * * *

UNITED STATES PATENT AND TRADEMARK OFFICE
CERTIFICATE OF CORRECTION

PATENT NO.   : 6,703,082 B1  
DATED        : March 9, 2004  
INVENTOR(S)  : Wand et al.

Page 1 of 3

It is certified that error appears in the above-identified patent and that said Letters Patent is hereby corrected as shown below:

Column 11,  
The fifth structure, replace "  " with

-- 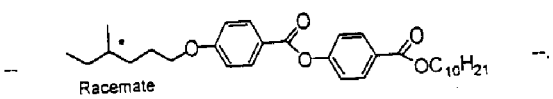 --.

The sixth structure, replace " 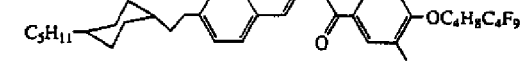 "

with -- 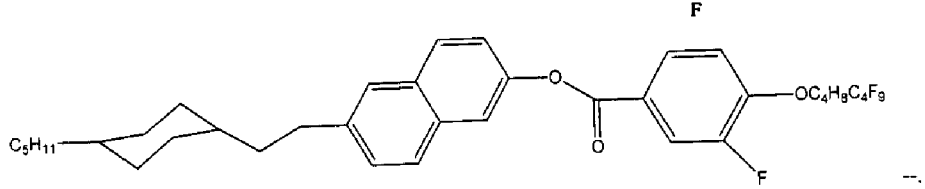 --.

Column 13,  
Line 1, insert -- Other examples of bistable hosts are listed below. -- before "Table 1.".

Column 17,  
Line 1, insert -- Other bistable mixtures are listed in Table 2 -- before "Table 2.".

Columns 19-20,  
The second structure, replace

" 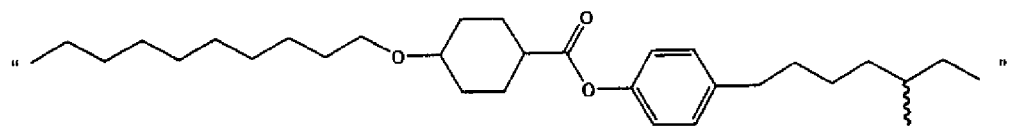 "

with -- 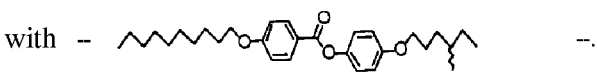 --.

Columns 21-22,  
The seventh structure, replace

" 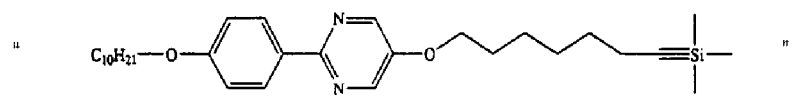 "

with -- 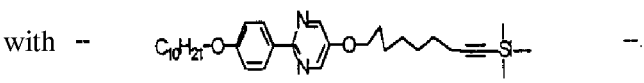 --.

UNITED STATES PATENT AND TRADEMARK OFFICE
CERTIFICATE OF CORRECTION

PATENT NO. : 6,703,082 B1  Page 2 of 3
DATED : March 9, 2004
INVENTOR(S) : Wand et al.

It is certified that error appears in the above-identified patent and that said Letters Patent is hereby corrected as shown below:

Columns 21-22,
At the end of the ninth structure, replace "$C_4F$" with -- $C_4F_9$ --.

Column 33,
In structure 7, replace "$CO_2B$" with -- $CO_2Et$ --.

Column 34,
Structure 13, replace " 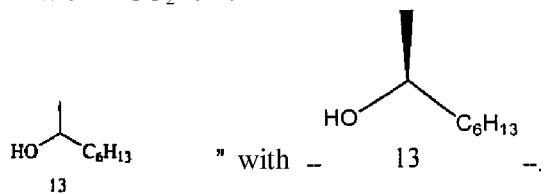 " with -- 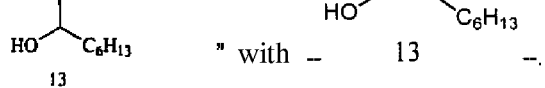 --.

Column 37,
Between Structures 15 and 16, replace "LSH" with -- LAH --.

Column 38,
Between Structures 17 and 18, replace "$PBr_2$" with -- $PBr_3$ --.

Columns 37-38,
Between Structures 21 and 22, replace "$ChCl_3$" with -- $CHCl_3$ --.

Column 45,
Structure 13, replace " 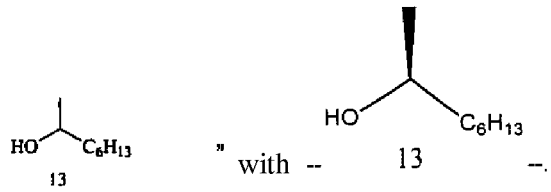 " with -- 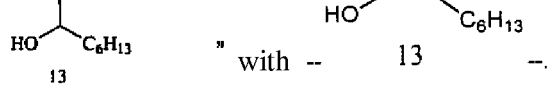 --.

Columns 45-46,
In structure 41, replace "$C_3F_9$" with -- $C_4F_9$ --.
In structure 42, replace "$C_3F_9$" with -- $C_4F_9$ --.

Column 46,
In structure 43, replace "$C_3F_9$" with -- $C_4F_9$ --.

Column 48,
Line 44, replace "(43 as" with -- (43) as --.

Columns 51-52,
Structures 58, 57 and 59, move 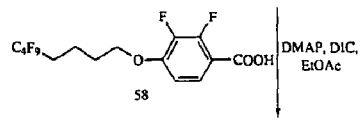

UNITED STATES PATENT AND TRADEMARK OFFICE
CERTIFICATE OF CORRECTION

PATENT NO. : 6,703,082 B1
DATED : March 9, 2004
INVENTOR(S) : Wand et al.

It is certified that error appears in the above-identified patent and that said Letters Patent is hereby corrected as shown below:

Columns 51-52 (cont'd), to before 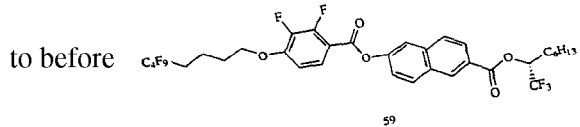

Column 56,
Middle line of scheme, replace "12B" with -- 13B --.

Structure 14A/B, replace " 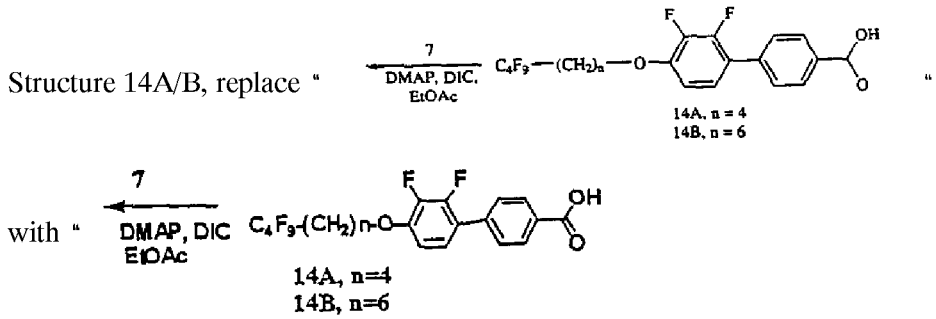 "

Column 60,
Line 45, replace "FTC" with -- FLC --.

Signed and Sealed this

Twenty-first Day of June, 2005

JON W. DUDAS
*Director of the United States Patent and Trademark Office*